United States Patent [19]
Roche

[11] 3,720,005
[45] March 13, 1973

[54] AUDIO-VISUAL SYSTEM
[75] Inventor: John L. Roche, St. Paul, Minn.
[73] Assignee: Minnesota Mining and Manufacturing Company, St. Paul, Minn.
[22] Filed: Feb. 12, 1971
[21] Appl. No.: 114,834

[52] U.S. Cl. .......................35/8 A, 35/9 A, 353/19, 274/1 A
[51] Int. Cl. .................................................G09b 3/06
[58] Field of Search....35/8 R, 8 A, 9 R, 9 A; 353/19, 353/120; 274/1 A

[56] References Cited

UNITED STATES PATENTS

| | | | |
|---|---|---|---|
| 3,659,030 | 4/1972 | Scott | 35/8 A |
| 3,504,445 | 4/1970 | Goldmark et al. | 35/9 R |
| 3,383,114 | 5/1968 | Ryan | 35/8 A X |
| 3,252,229 | 5/1966 | Van Ostrom | 35/9 A |
| 3,122,053 | 2/1964 | Dimitracopoulos et al. | 40/28.1 X |
| 3,483,633 | 12/1969 | Geils et al. | 35/9 A |

Primary Examiner—Wm. H. Grieb
Attorney—Kinney, Alexander, Sell, Steldt & Delahunt

[57] ABSTRACT

An audio-visual system for presenting correlated audio and visual information comprising a thin audio-visual record medium and an audio-visual presentation apparatus. The audio-visual record medium comprises an audio record including in a predetermined sequence a plurality of sound tracks containing recorded audio information, with each sound track having a beginning at a given position near the periphery of the audio record and with the sound track beginnings distributed at predetermined intervals; and a visual record including a plurality of spaced visual display areas containing projectable visual information correlated with the information recorded in the sound tracks, which visual display areas are positioned in a predetermined sequence corresponding to the predetermined sequence of sound tracks. The visual display areas further include a given number of projectable predetermined response choices and a like number of projectable predetermined programs individually relating a predetermined response choice to the subsequent presentation of a correlated visual display area and sound track combination. The audio-visual presentation apparatus comprises means for receiving the audio-visual record medium, audio reproducing means, a viewing screen, projection means, and positioning means for relatively positioning the audio reproducing means and the audio record for enabling the audio reproducing means to engage the beginning of any of the sound tracks and for relatively positioning the projection means and the visual record for enabling projection onto the viewing screen of an image of visual information from any of the visual display areas. The positioning means are controlled by control means in accordance with a projectable predetermined program sensed in response to the operation of selection means to select one of the given number of response choices projected onto the viewing screen.

26 Claims, 27 Drawing Figures

PATENTED MAR 13 1973  3,720,005
SHEET 01 OF 10
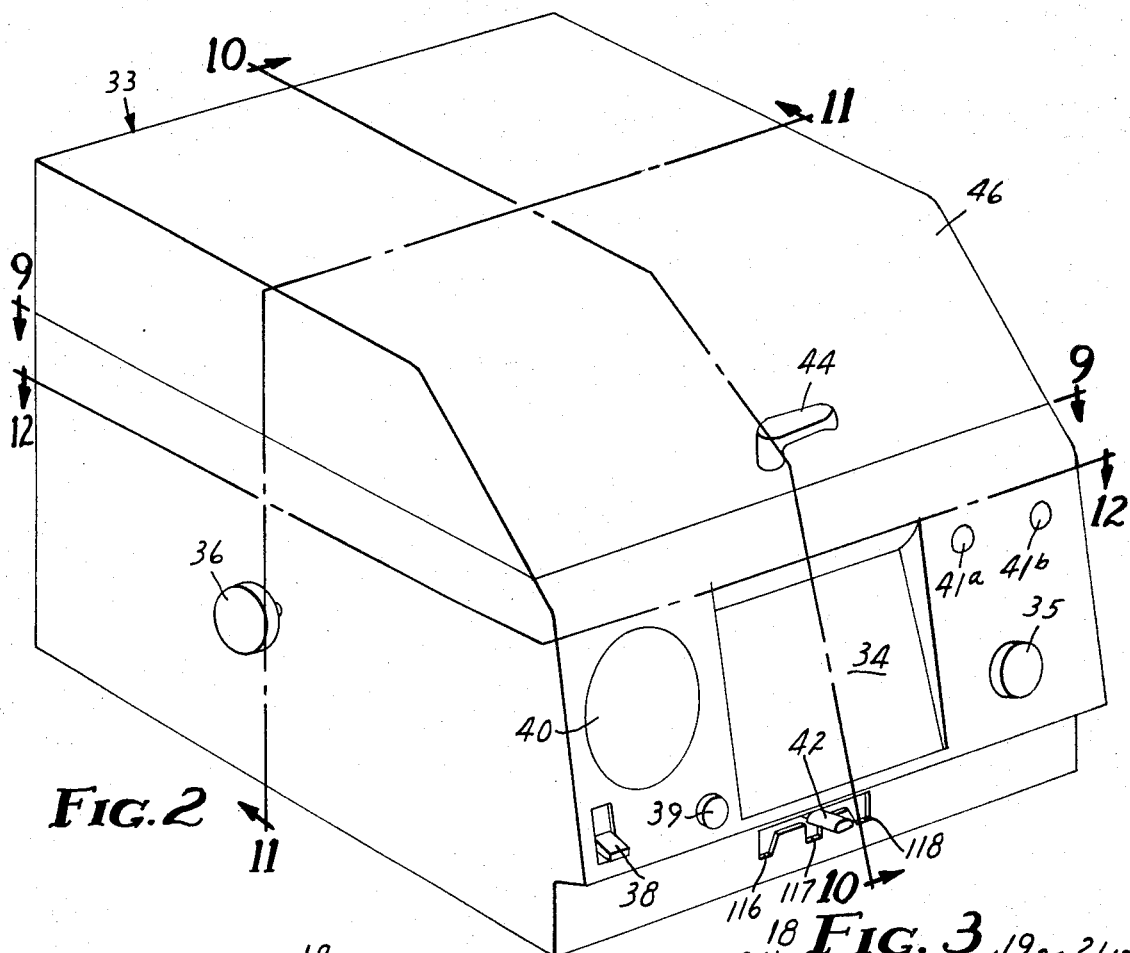
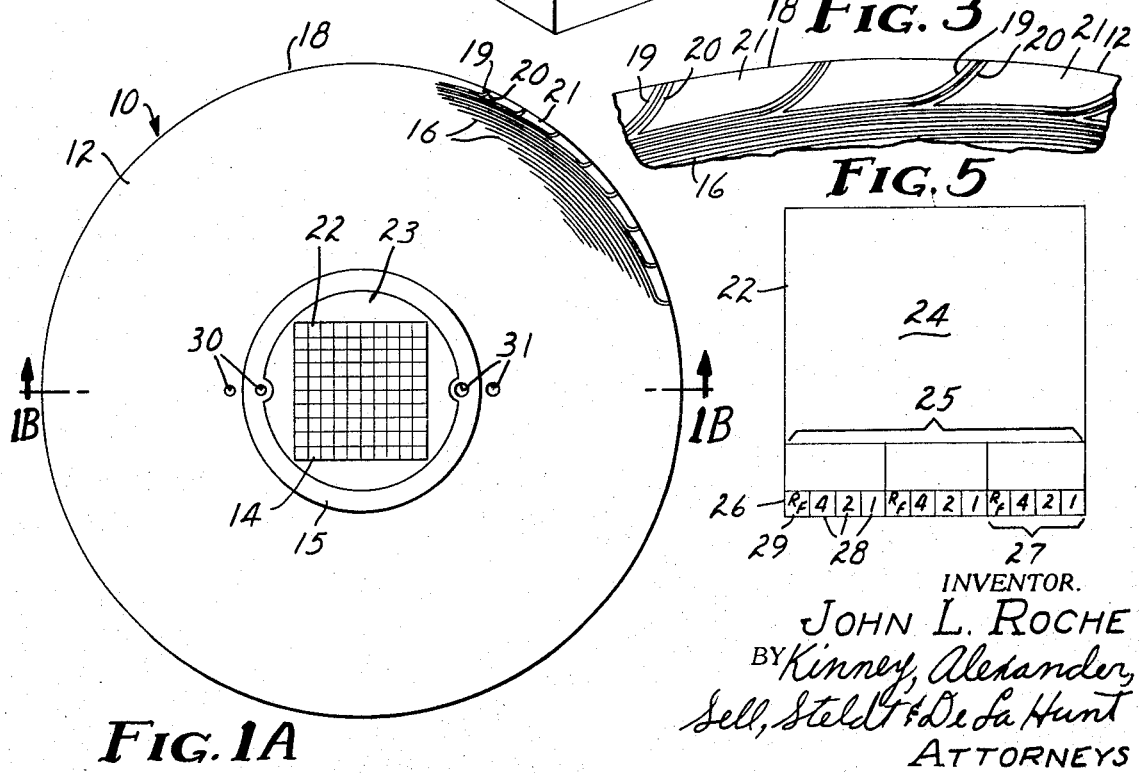
INVENTOR.
JOHN L. ROCHE
BY Kinney, Alexander,
Sell, Steldt & DeLa Hunt
ATTORNEYS

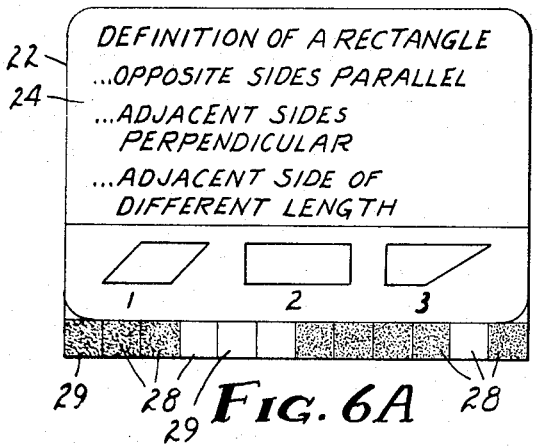
FIG. 6A
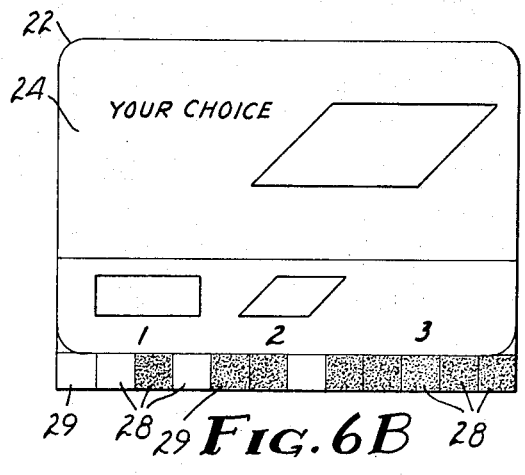
FIG. 6B
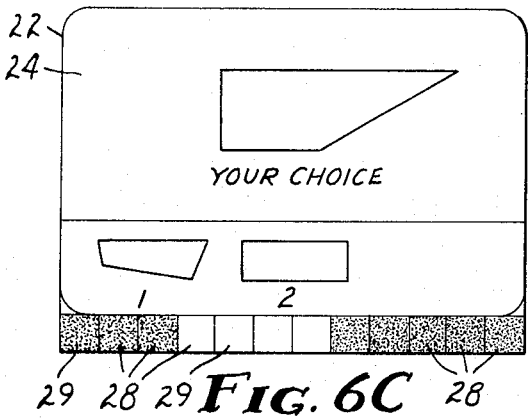
FIG. 6C
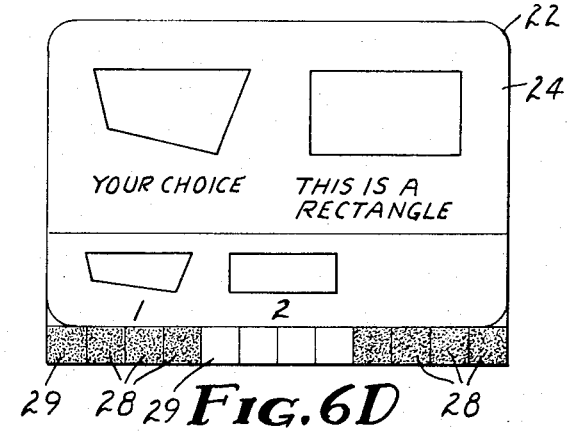
FIG. 6D
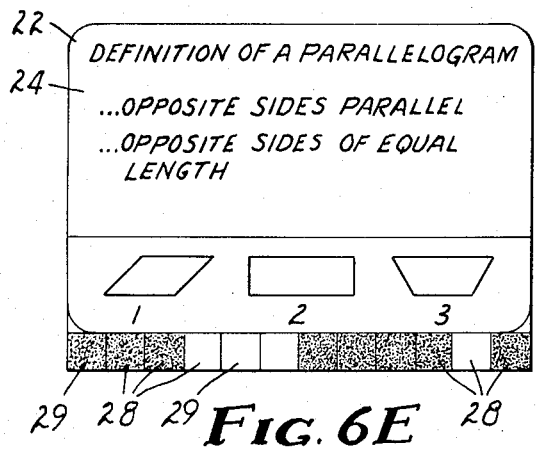
FIG. 6E
FIG. 4

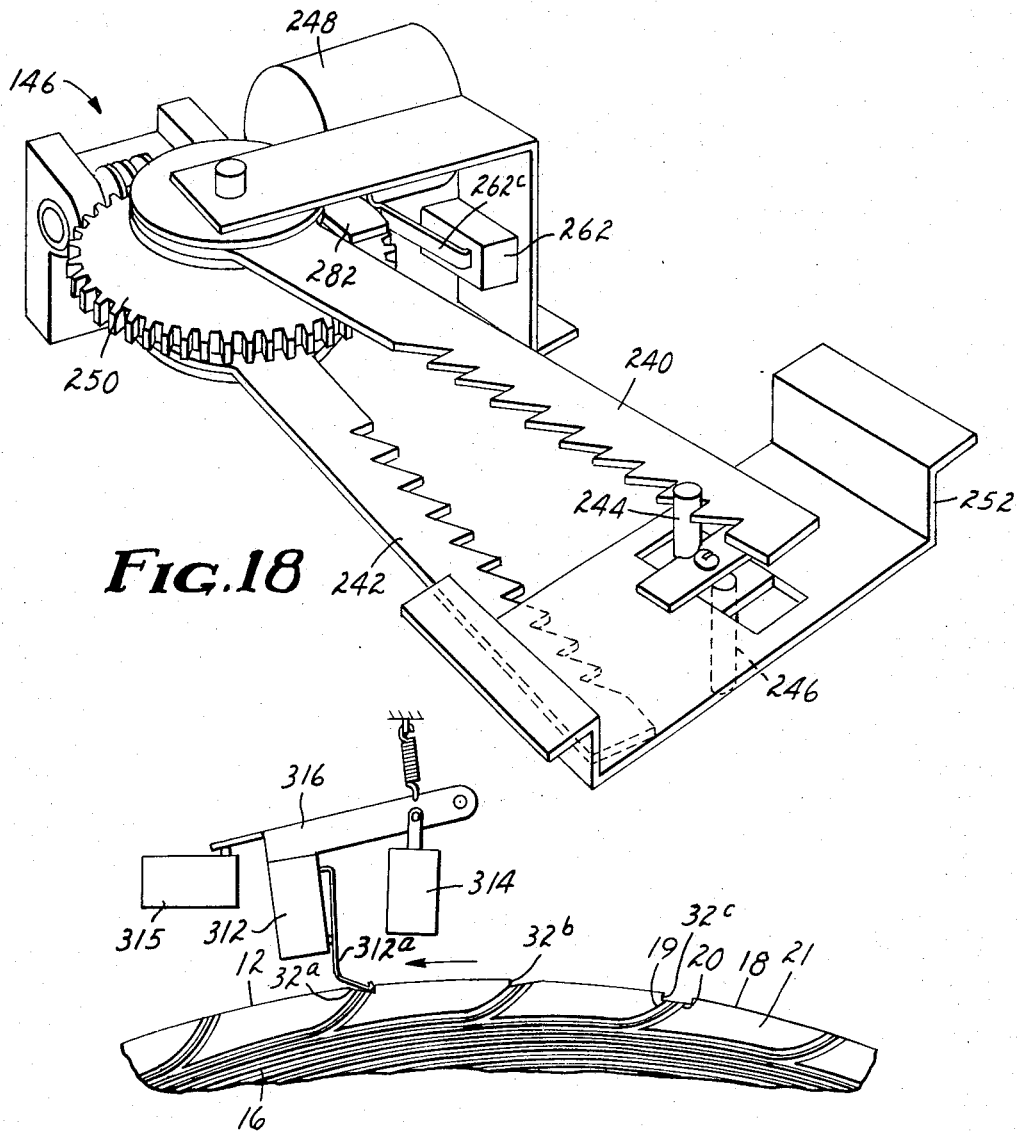
FIG. 18
FIG. 8
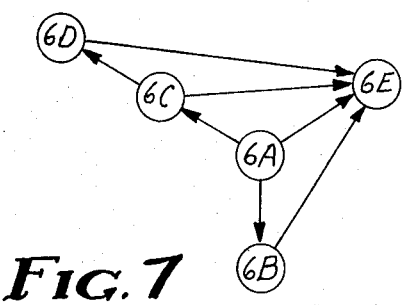
FIG. 7

INVENTOR.
JOHN L. ROCHE
BY Kinney, Alexander,
Sell, Steldt & DeLaHunt
ATTORNEYS

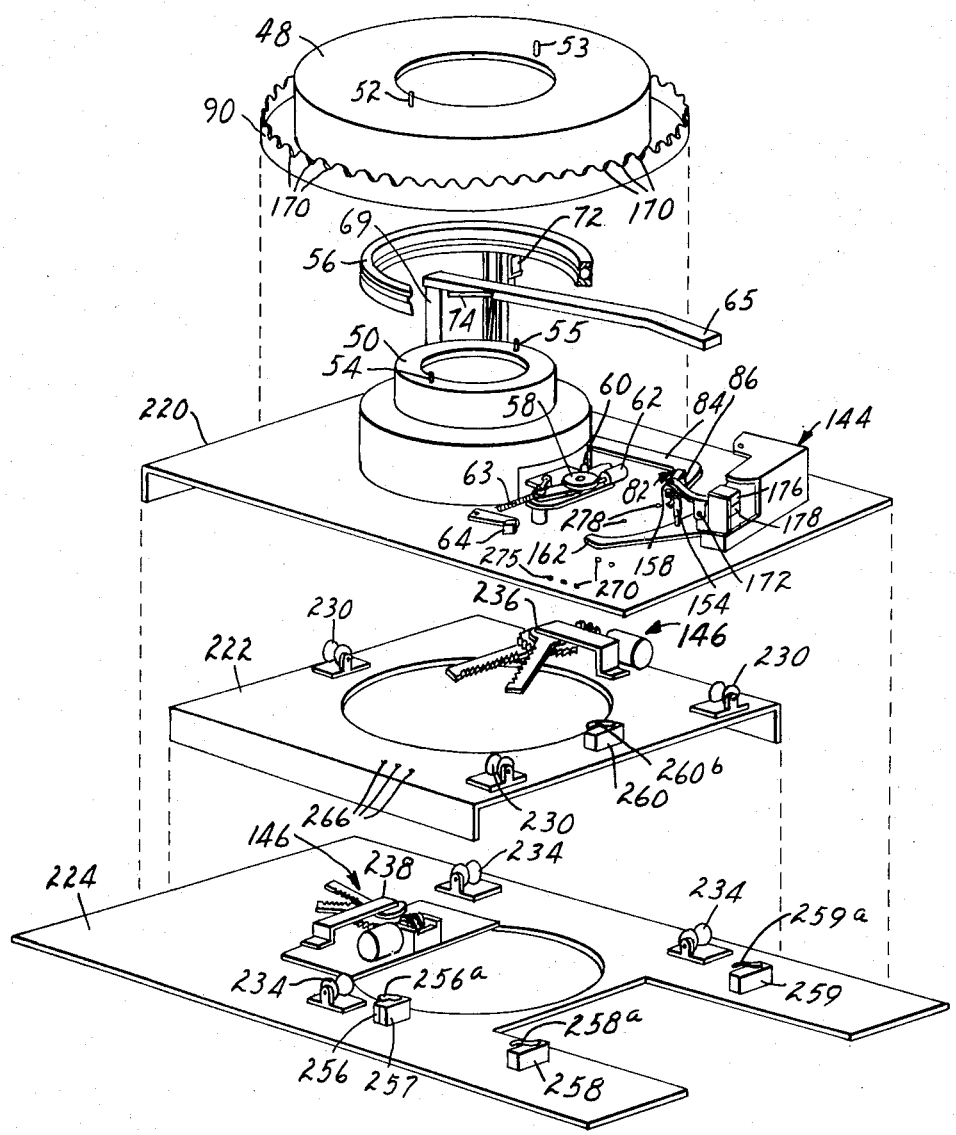
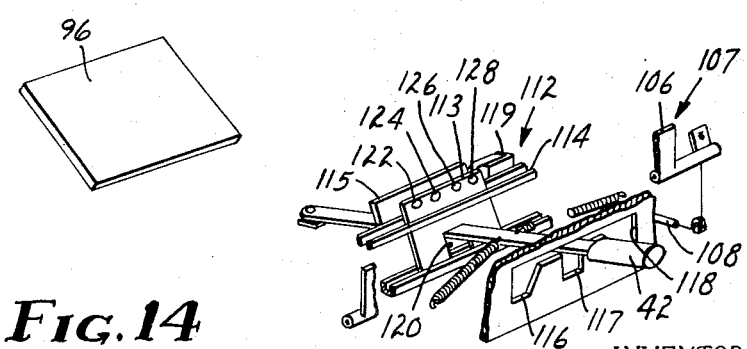
FIG.14

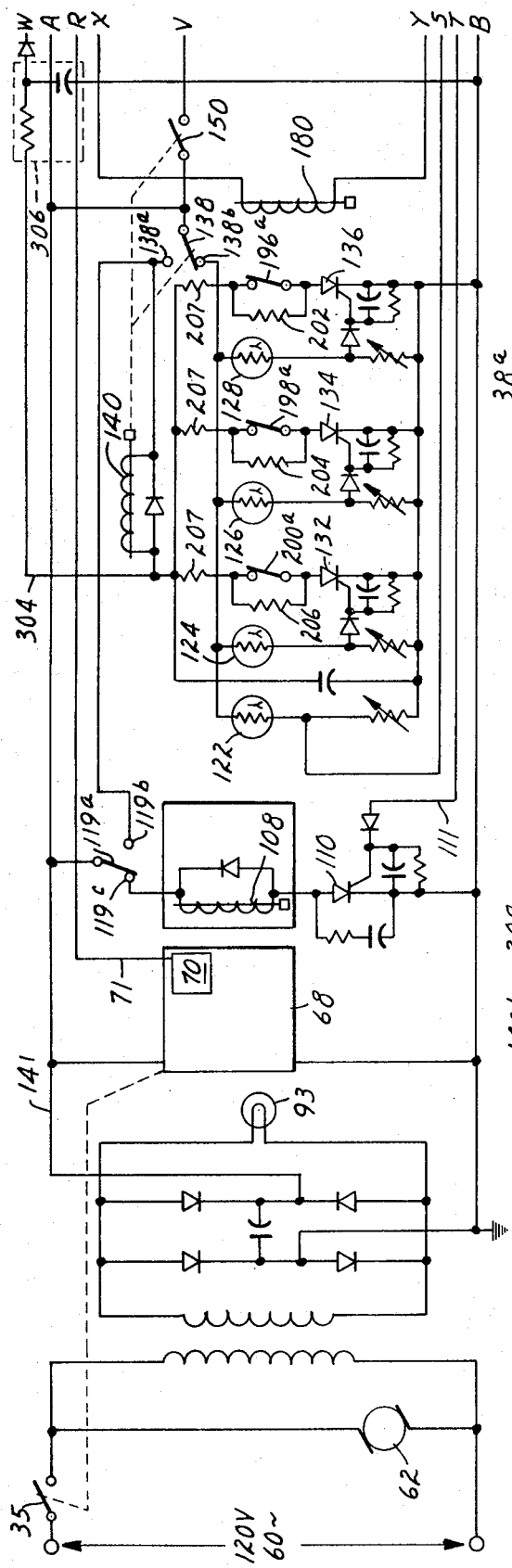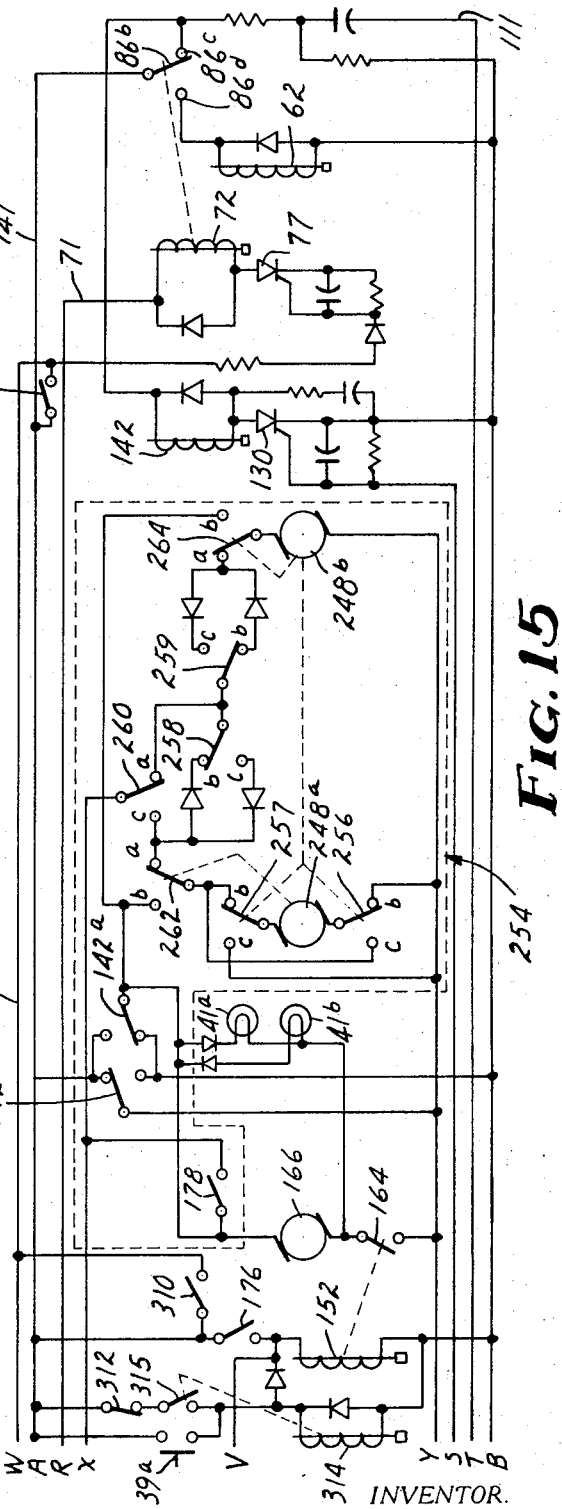
FIG. 15

INVENTOR.
JOHN L. ROCHE

AUDIO-VISUAL SYSTEM

BACKGROUND OF THE INVENTION

1. Field Of The Invention

The present invention pertains to an audio-visual system for presenting correlated audio and visual information from a record medium and is particularly directed to the type of audio-visual system which is useful in an educational system for providing a plurality of correlated audio and visual presentations from a record medium, and which includes means for enabling an operator of the system to select from one of a plurality of predetermined response choices related to the presented audio and visual information.

2. Description Of The Prior Art

The present invention is directed to an improvement in an audio-visual system for presenting correlated audio and visual information from a thin audio-visual record medium, such as is disclosed in U. S. Pat. No. 3,504,455 to Goldmark et al. Certain features of this invention are set forth in various other U. S. patents. The provision of the capability of reacting to operator response choices to branch or alter the display of the correlated audio and visual information in accordance with a predetermined program is disclosed in U. S. Pat. No. 3,501,851 to Price et al. The placement of a photographic slide containing visual information within an open center portion of a thin audio record medium is disclosed in U. S. Pat. No. 2,961,922 to Schwartz and in U. S. Pat. No. 3,270,614 to Paull. The provision of a plurality of spiral sound track grooves on an audio record disk is disclosed in U. S. Pat. No. 3,017,187 to Ryan. The provision of predetermined program indicia on a visual record is disclosed in U. S. Pat. No. 3,471,942 to Weitzman. The provision of three sections in a recorded visual display area (1) for providing the visual display information, (2) for providing a plurality of predetermined operator response choices related to the visual display information, and (3) for providing predetermined program indicia for controlling the operation of the audio-visual system in accordance with the particular operator selected predetermined response choice to the present information, is disclosed in U. S. Pat. No. 3,497,966 to Gaven. A device for positioning a rectangular film containing a plurality of visual display areas arranged in a spaced matrix containing $m$ rows of $n$ visual display areas in order to newly align a projection means with a visual display area in response to an operator selected response choice is described in U. S. Pat. No. 3,521,379 to Hannah. The Hannah device differs from the present invention in that according to Hannah the new alignment is in accordance with a projectable predetermined program on the film at the newly aligned visual display area.

Each of these features contributes certain advantages in the versatility and the capacity of an audio-visual system, these advantages being discussed in the various patents cited. None of these patents, however, suggests a system combining all of these features nor do they suggest how all of these features might be combined.

SUMMARY OF THE INVENTION

The present invention provides an audio-visual system for presenting correlated audio and visual information comprising a thin audio-visual record medium and an audio-visual presentation apparatus.

The audio-visual record medium comprises an audio record including a plurality of sound tracks containing recorded information with each sound track having a beginning at a given position near the periphery of the audio record. The sound track beginnings are placed in a predetermined sequence about the periphery of the audio record at predetermined intervals. The audio-visual record medium also comprises a visual record including a plurality of spaced visual display areas containing projectable visual information. Each of the visual display areas contains information correlated with the information recorded in a sound track. The visual display areas are positioned in a predetermined sequence corresponding to the predetermined sequence of sound tracks.

The audio-visual presentation apparatus comprises receiving means for receiving the thin audio-visual record medium; audio reproducing means positioned for engaging a sound track of the received audio record for reproducing and thereby presenting the audio information therefrom; projection means positioned for projecting and thereby presenting an image of visual information from the visual display area of the received visual record onto a viewing screen; and positioning means for relatively positioning the audio reproducing means and the audio record for enabling the audio reproducing means to engage the beginning of any of the sound tracks distributed about the periphery of the received audio record, and for relatively positioning the projection means and the visual record for enabling projection onto the viewing screen of an image of visual information from any of the visual display areas thereof.

Various features of the present invention are next set forth in this summary, with reference to certain preferred embodiments in which these features are incorporated.

Each of the visual display areas includes a discrete section containing a given number of projectable predetermined response choices related to the visual information contained in the visual display area. Accordingly, the presentation apparatus further comprises a shutter supported between the viewing screen and the projection means. The shutter is positionable in either a blocking position for blocking the projection of an image of the response choices onto the screen, or in an enabling position for enabling the projection of an image of the response choices onto the screen. The shutter is moved into the enabling position upon completion of the reproduction of audio information from a sound track by the audio reproducing means.

Each of the visual display areas includes a given number of projectable predetermined programs, each program individually relating a predetermined response choice to a predetermined correlated visual display area and sound track combination. Accordingly, the audio-visual presentation apparatus further comprises selection means for enabling an operator to select one of the given number of predetermined response choices; sensing means responsive to the operation of the selection means for sensing the one of the projectable predetermined programs which is related to the selected response choice; and control means responsive to the operation of the selection means for controlling the positioning means in accordance with the sensed predetermined program.

The audio record is ring-like and has a given inside diameter; and the visual record is circular and has a diameter generally corresponding to the given inside diameter of the audio record and is concentric with the audio record. In this embodiment, the audio record is rotatable relative to the visual record. Accordingly, the audio-visual presentation apparatus includes a rotatable turntable for receiving the audio record, which turntable has a central opening generally corresponding in size to the size of the visual record. A platform for receiving the visual record is supported within the central opening of the turntable. The audio and visual records are co-registered on the turntable and platform for simultaneously presenting information from correlated sound tracks and visual display areas.

The turntable is rotatably supported on a carriage, and the platform is fixedly supported on the carriage. The positioning means includes turntable stepping means supported by the carriage for rotating the turntable in incremental steps, which steps correspond to the intervals between the beginnings of the sound tracks of the audio record, and carriage (platform) stepping means supported by the presentation apparatus chassis for stepping the carriage (platform) in incremental steps, which steps correspond to the spacing of the visual display areas of the visual record.

The audio-visual presentation apparatus further comprises a turntable drive means supported by the carriage for engaging the turntable for rotatably driving the turntable at a uniform rate to enable audio information to be reproduced from a received audio record when the latter is engaged by the audio reproducing means which is also supported by the carriage.

To readily facilitate the positioning of the turntable by the turntable stepping means, and to maintain co-registration between correlated sound tracks and visual display areas, it is preferable that upon the completion of the reproduction of audio information from a given sound track the turntable return to the position from which it started. While such return could be assured by providing a turntable drive means which rotates the turntable some predetermined multiple of 360°, such a technique is not preferred since the duration of the audio information in the sound tracks is different for different sound tracks, and it is preferred to terminate the uniform turntable rotation as soon as possible after the reproduction of the audio information is completed. Accordingly, the audio-visual presentation apparatus further comprises a starting position marker rotatably positioned on the turntable; a detecting means located on the carriage in a fixed home position in relation to the audio reproducing means and enabled in response to the completion of the reproduction of audio information from a sound track by the audio reproducing means for detecting when the starting position marker on the turntable is at the home position; and a turntable braking means supported by the carriage for engaging the turntable to thereby brake the turntable to a stop, which turntable braking means engages the turntable to brake the turntable to a stop when the detecting means detects that the starting position marker is at the home position.

When the turntable is stepped to a new starting position, the starting position marker must be re-positioned on the turntable. Accordingly, a starting position marker holder is movably supported on the carriage for movement into position to hold the starting position marker at the home position while the turntable is being stepped by the turntable stepping means.

The turntable drive means is disengaged from the turntable when the detecting means detects that the starting position marker is at the home position.

The starting position marker holder, the turntable braking means, and the turntable stepping means are each supported on the carriage. When the selection means is operated, the starting position marker holder moves into position to hold the starting position marker at the home position, the turntable braking means is disengaged from the turntable, and the turntable stepping means moves into position to engage the turntable.

Each of the projectable predetermined programs of a given visual display area includes first indicia for indicating the number of sound tracks and visual display areas in their respective sequences that the predetermined correlated sound track-visual display area combination related to the predetermined response choice by said program is placed from the given visual display area and its correlated sound track. Accordingly, the control means comprises counting means for counting the number of steps stepped by the stepping means, and registering and gating means for registering a count in accordance with the first indicia of the sensed predetermined program and for enabling the stepping means to repetitively incrementally step until the number of steps counted by the counting means equals the registered count.

The control means causes the audio reproducing means to repeat the audio information presented from the engaged sound track when the first indicia indicate that the stepping means should step zero steps.

In order to allow greater flexibility in the placing of the audio and visual information at given positions on the record medium, the positioning means has the capability of effecting bidirectional stepping within the sequences of correlated sound tracks and visual display areas. Therefore, each of the projectable predetermined programs of a given visual display area further includes second indicia for indicating the direction in the sequences of sound tracks and visual display areas that the predetermined correlated sound track-visual display area combination related to the predetermined response choice by said program is placed from the given visual display area and its correlated sound track. Accordingly, the control means further comprises a direction setting switching means for setting the stepping means in accordance with the second indicia of the sensed predetermined program to step the turntable and the carriage (platform) in either a forward or a reverse direction corresponding to forward and reverse directions in the sequence of sound tracks and visual display areas.

The plurality of visual display areas are arranged in a matrix containing $m$ rows of $n$ visual display areas. Within the matrix, the sequence of visual display areas correspond to the sequence of sound tracks in a manner wherein a first visual display area at one end of a first row of the matrix correlates with a first sound track, and the successive visual display areas following a path, beginning with the first visual display area and continuing in a first direction along the first row to the nth visual display area of the first row, thence to the adjacent visual display area in a predetermined adjacent row, which adjacent visual display area is the first visual display area of the predetermined adjacent row, thence in a second direction opposite to the first direction along the second row, respectively correlate with successive sound tracks distributed about the periphery in a predetermined direction beginning with the first sound track. Accordingly, the carriage is supported by the chassis for bidirectional movements parallel to either of two predetermined perpendicular X and Y axes corresponding to the matrix of the received visual record, with the X axis parallel to the m rows. The carriage (platform) stepping means is capable of bidirectionally stepping the carriage. Also, the control means further comprises X and Y axes drive means and first and second switching means.

The X axis drive means bidirectionally drives the carriage stepping means to step the carriage parallel to the X axis in a direction dependent upon the direction of current flow through the X axis drive means. The Y axis drive means bidirectionally drives the carriage stepping means to step the carriage parallel to the Y axis in a direction dependent upon the direction of current flow through the Y axis drive means.

The first switching means switches the direction of current flow through the X axis drive means to be in a first direction when the carriage is in a position for enabling projection from an odd row and switches the direction of current flow through the X axis drive means to be in a direction opposite to the first direction when the carriage is in a position for enabling projection from an even row. The second switching means switches current flow through the X axis drive means when the carriage is in a position for enabling projection from an nth position in a row while the carriage stepping means is set by the direction setting switching means for stepping the carriage in a reverse direction, or when the carriage is in a position for enabling projection from a first position in a row while the carriage stepping means is set by the direction setting switching means for stepping the carriage in a forward direction. The second switching means alternatively switches current flow through the Y axis drive means when the carriage is in a position for enabling projection from an nth position in a row while the carriage stepping means is set by the direction setting switching means for stepping the carriage in a forward direction, or when the carriage is in a position for enabling projection from a first position in a row while the carriage stepping means is set by the direction setting switching means for stepping the carriage in a reverse direction.

The control means further comprises a third switching means which switches current flow to the X and Y axes drive means through the second switching means when the carriage is in a position for enabling projection from either end of a row, and switches current flow by-passing the second switching means and through the X axis drive means when the carriage is not in a position for enabling projection from either end of a row.

The control means still further comprises a fourth switching means to momentarily enable current flow through the X and Y axes drive means a number of times corresponding to the number of steps that the stepping means should step in accordance with the first indicia of the sensed predetermined program.

Each of the X and Y axes drive means, when actuated, moves from a rest position and causes the carriage stepping means to step the carriage one step during a cycle of operation which is completed upon the actuated drive means returning to the rest position. Accordingly, the control means additionally comprises fifth and sixth switching means. The fifth switching means is actuated by the X axis drive means, when the X axis drive means is not in the rest position, for switching current flow through the X axis drive means to maintain the cycle of operation of the X axis drive means until the completion of the cycle. Likewise, the sixth switching means is actuated by the Y axis drive means, when the Y axis drive means is not in the rest position, for switching current flow through the Y axis drive means to maintain the cycle of operation of the Y axis drive means until the completion of the cycle.

Each of a plurality of groups of adjacent sound tracks comprise sound tracks containing related information, with one sound track for each group being the sequentially first sound track for that group (i.e., the first of the group to be presented). In one preferred embodiment, the audio record contains notches about the periphery at positions corresponding to the beginnings of the sequentially first sound tracks. Accordingly, the control means further comprises a notch detector switching means positioned for detecting notches in the periphery of the received audio record, and access switching means enabled by the notch detector switching means for enabling an operator to effect relative motion between the audio record and the audio reproducing means and between the visual record and the projection means until a notch is detected, to thereby move the sequentially first sound track of the adjacent previously presented group and the correlated visual display area into position for enabling presentation of audio and visual information therefrom.

BRIEF DESCRIPTION OF THE DRAWING

FIG. 1A is a plan view of the audio-visual record medium showing only a portion of the sound tracks thereof.

FIG. 2 is a perspective view of the audio-visual presentation apparatus showing the exterior of the cabinet.

FIG. 3 is an enlarged fragmentary plan view of an edge portion of the audio-visual record medium of FIG. 1A showing the detail of the sound track beginnings.

FIG. 4 is a schematic representation of the visual display area matrix showing the predetermined sequence of visual display areas corresponding to a counterclockwise sequence of the sound tracks of the audio-visual record medium of FIG. 1A.

FIG. 5 is a schematic view of a single visual display area of the audio-visual record medium of FIG. 1A.

FIGS. 6A through 6E are illustrations of five different visual display areas in the audio-visual record medium of FIG. 1A.

FIG. 7 is a schematic diagram of a branching sequence relating the five visual display areas shown in FIGS. 6A through 6E.

FIG. 8 is an enlarged fragmentary plan view of an edge portion of an alternative embodiment of the record medium of FIG. 1A showing the detail of the sound track beginnings, notches in the audio record periphery, and switching means in cooperation with the notches.

FIG. 14 is a perspective exploded view of the audio-visual presentation apparatus, with certain portions broken away or omitted for purposes of clarity.

FIG. 15 is a schematic diagram of the electrical circuit of the audio-visual presentation apparatus.

FIG. 18 is a perspective view of the X axis stepping means in cooperation with pins attached to the carriage.

DESCRIPTION OF THE PREFERRED EMBODIMENT

Record Medium

Figure 12:
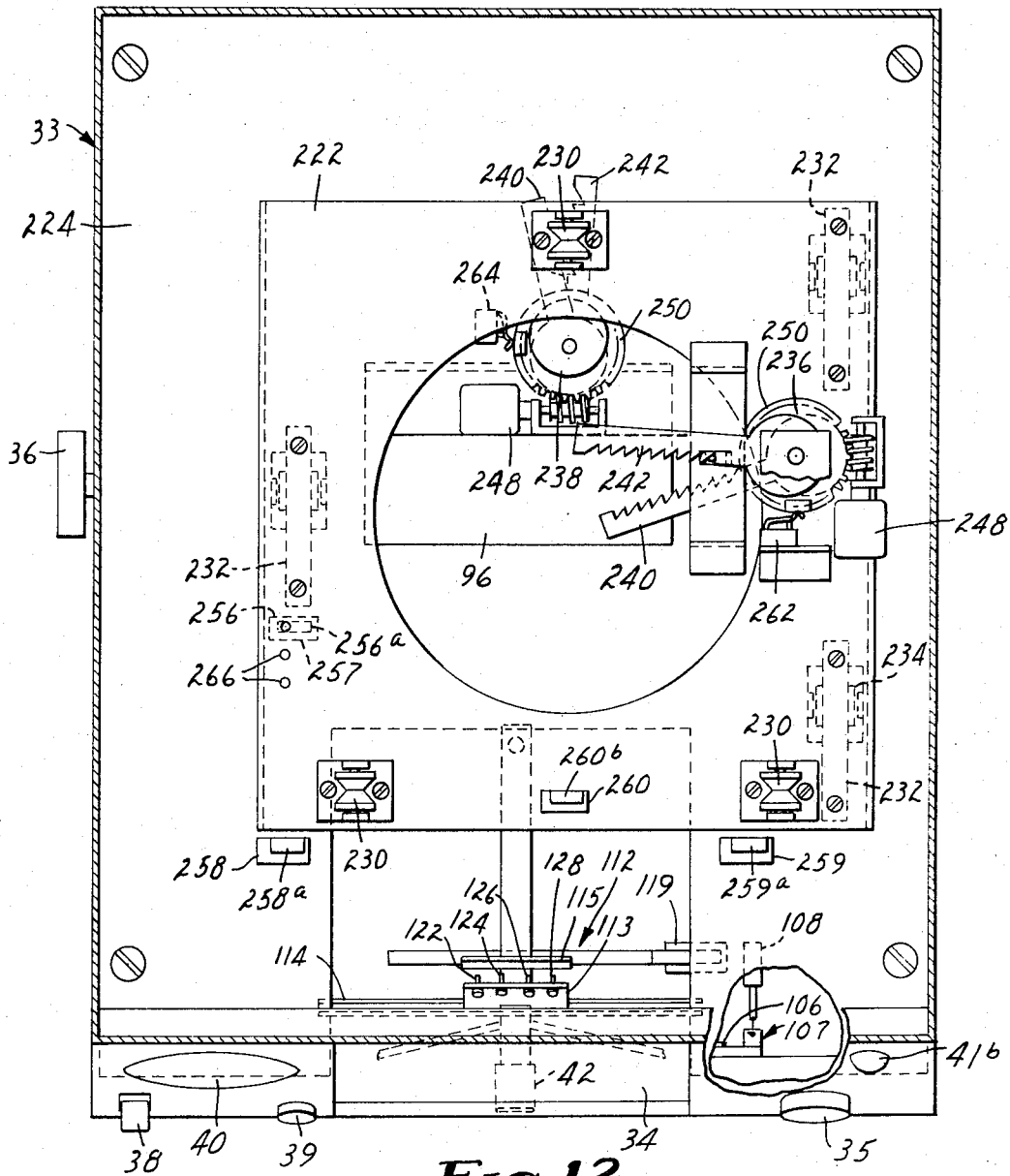
FIG. 12 is a sectional view of the interior of the audio-visual presentation apparatus taken along line 12—12 of FIG. 2, with certain portions broken away or omitted for purposes of clarity.

The audio-visual record medium 10 is generally disk-shaped and includes an audio record 12 and a visual record 14. The audio record 12 is ring-like and has a given inside diameter of about 4 inches (100 cm) and an outside diameter of about 12 inches (300 cm). The visual record 14 is circular and has a diameter of 4 inches (100 cm) which generally corresponds to the given inside diameter of the audio record 12. The audio and visual records 12, 14 are concentric with and rotatable relative to one another.

The audio record 14 includes a collar 15 which protrudes over the inside edge of the audio record 12 for maintaining the visual record 14 within the center of the audio record 12.

Each side of the audio record 12 contains 50 sound tracks 16, each of which is a phonographically recorded groove beginning at a given position near the periphery 18 of the audio record 12. Sound is reproduced from these sound tracks 16 by a typical phonographic technique of rotating the audio record 12 past a stylus contained in a typical phonographic tone arm.

Referring to FIG. 3, the 50 sound track grooves 16 are 50 individual interleaving spiral grooves such as are described in the aforementioned U. S. Pat. No. 3,017,187, except that the audio record 12 is improved thereover by further including additional lead-in grooves 19, 20 for each sound track which guide the stylus into its proper track. These lead-in grooves 19, 20 merge at inner ends into the sound tracks 16 to form a sound track beginning having two legs. The outer ends of the lead-in grooves 19, 20 run off the periphery 18 of the audio record 12. To assure entry into the proper sound track 16, a stylus then must only be set down in the region 21. The natural skating force of a stylus would cause it to move naturally toward the inside of the disk and into the sound track 16.

Figure 1B:
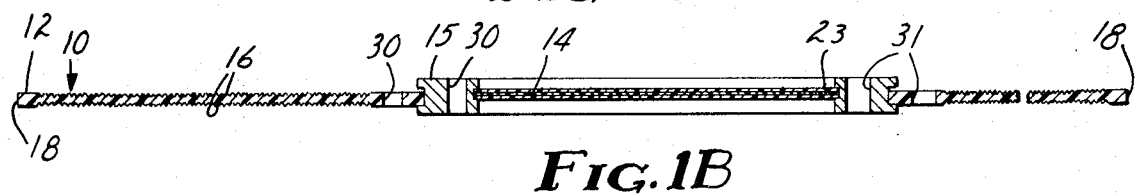
FIG. 1B is a cross-sectional view of the audio-visual record medium taken along line 1B—1B of FIG. 1A with a portion omitted.

The visual record 14 includes a plurality of spaced visual display areas 22. These visual display areas 22 are contained in a single frame of 2 ½ inch (6.2 cm) square diapositive transparency which is held between two pieces of transparent material 23, which are inserted in and held by, or molded integrally with, the collar 15 (FIG. 1B). The transparency contains 100 visual display areas 22. Referring to FIG. 4, 50 visual display areas are arranged in five rows of 10 visual display areas 22 and are positioned for projection of the information contained therein in one direction. The visual display areas 22 are numbered in the sequence in which they would be presented in correlation with a counterclockwise progression in the sequence of sound track beginnings about the audio record periphery 18. Adjacent to the first set of 50 visual display areas 22 is a second set of visual display areas arranged in five rows of 10 each for projection of the contained information when the "flip" side of the audio record 12 is used. Altogether, the visual display areas 22 form a 10 by 10 matrix. One set of 50 visual display areas is correlated with the sound tracks 16 on one side of the audio record 12 and the other set of 50 visual display areas is correlated with the sound tracks 16 on the flip side.

The sequence of the visual display areas 22 within the matrix is as follows. On each side of the record 10, the sequence begins in the upper left corner and proceeds along the top row to the right end thereof, thence to the second row and back along the second row to the left end thereof, thence to the third row and along the third row to the right end thereof, thence to the fourth row and along the fourth row to the left end thereof, and thence to the fifth row and along the fifth row to the right end thereof. The visual display areas 22 are numbered accordingly in FIG. 4.

Referring to FIG. 5, each of the visual display areas 22 contains a section 24 which includes visual information correlated to a given one of the various sound tracks 16. Each of the visual display areas 22 also includes a section 25 which includes up to three projectable predetermined response choices. Each visual display area 22 further contains a section 26 which includes one or more predetermined programs 27. Each program 27 includes first indicia 28 and second indicia 29 which relate one of the response choices to the subsequent presentation of a correlated visual display area 22 and sound track 16 combination. The first and second indicia 28, 29 are shown schematically in FIG. 5 and illustrated in FIG. 6A.

The first indicia 28 are either darkened or transparent to provide a binary number for indicating the number of the intervals in the sequence of sound tracks 16 and spaces in the sequence of visual display areas 22 that a predetermined sound track-visual display area combination is displaced from the given visual display area 22 and its correlated sound track 16. The value of each of the first indicia 28, when not darkened, is shown schematically in FIG. 5. The desired number of spaces is indicated by a sum of the values of the undarkened blocks 28.

The second indicia 29 provides an indication of the direction in the sequences of sound tracks 16 and visual display areas 22 that a predetermined sound track-visual display area combination is displaced from the given visual display area 22 and its correlated sound track 16. In FIG. 5, the second indicia 29 are shown schematically by the blocks 29, labeled RF. When this block 29 is darkened, a reverse direction in the sequence is indicated. When block 29 is not darkened, a forward sequence is indicated.

Referring to the three programs illustrated in FIG. 6A, the program related to response choice number 1 indicates a reversal of one space; the program related to response choice number 2 indicates forward movement of four spaces; and the program related to response choice number 3 indicates a reversal of two spaces.

Both the audio and visual records 12, 14 include as registration means sets of holes 30, 31 which allow the audio and visual records 12, 14 to be rotatably positioned in relation to each other on pins contained on an audio-visual presentation apparatus to thereby enable correlated sound tracks 16 and visual display areas 22 to be co-registered for simultaneous presentation. Note that the holes 31 are larger than the holes 30. The audio record 12 may thus be held in a fixed position on a rotatable turntable, while the visual record 14 is thus held in a fixed position on a non-rotatable platform. The manner of maintaining co-registration between the correlated sound tracks 16 and visual display areas 22 will be discussed hereinafter in the description of the presentation apparatus.

Referring to FIGS. 6A through 6E, there is shown a series of five visual display areas 22 from a sample self-study course on geometry. This study course includes a branching sequence which is shown schematically in FIG. 7. Again referring to FIGS. 6A through 6E, the audio contents of the sound tracks 16 which are correlated with the illustrated visual display areas 22 are as follows:

FIG. 6A
Now you can identify a square. Let's meet the RECTANGLE. A rectangle, like the square is a four sided figure. He has two sides parallel to each other and his adjacent sides are perpendicular. The rectangle, however, is different from the square because two adjacent sides are of different length.
Can you select the figure which matches the definition of our rectangle?

FIG. 6B
You picked this figure. He has opposite sides parallel all right . . . but he's not a rectangle. Remember our definition of a rectangle . . .
. . . opposite sides parallel
. . . adjacent sides perpendicular
. . . adjacent sides of different length
Now . . . can you pick out the rectangle?

FIG. 6C
Your choice has two sides parallel all right . . . but it's not a rectangle. Remember . . . our definition of a rectangle . . .
. . . opposite sides parallel
. . . adjacent sides perpendicular
. . . adjacent sides of different length
Now . . . can you pick our rectangle out?

FIG. 6D
Your choice has sides of different lengths all right . . . in fact . . . too many . . . none parallel . . . none perpendicular. Remember our definition of a rectangle . . .
. . . opposite sides parallel
. . . adjacent sides perpendicular
. . . adjacent sides of different length
Now . . . let's try again . . . which one is the rectangle?

FIG. 6E
Very good . . . you can now recognize and define a rectangle. Now let's look at another four sided figure . . . the parallelogram. It has opposite sides parallel and opposite sides of equal length.
Can you select the parallelogram from among these choices?

The positions of these visual display areas and their correlated sound tracks in the "forward" sequence of the same is: 6D, 6C, 6B, 6A, . . . , . . . , . . . , 6E.

Referring to FIGS. 6A through 6E and 7, visual display area 6A and the correlated audio information are initially presented. Should the student select response choice number 1, visual display area 6B and the correlated audio information are next presented. Should he select response choice number 2, visual display area 6E and the correlated audio information are next presented, and should he select response choice number 3, visual display area 6C and the correlated audio information are next presented.

When visual display area 6C and the correlated audio information are presented and the student selects response choice number 1, then visual display area 6D and the correlated audio information are next presented. The manner in which the subsequent presentation of the different visual display areas 22 and their correlated sound tracks 16 is controlled in accordance with the program indicia 28, 29 which are sensed in accordance with the response choice 25 selected by the student will be discussed hereinafter in connection with the description of the control means of the presentation apparatus.

The sound tracks 16 correlated with visual display areas 6A through 6D constitute a group of sound tracks 16 containing related information. The sound track correlated with visual display area 6A is sequentially the first sound track for this group.

In one preferred embodiment of the audio record (FIG. 8), the periphery 18 contains notches 32a, 32b, 32c at positions corresponding to the beginnings of sequentially first sound tracks, such as the sound track correlated with the visual display area of FIG. 6A. The notches are not necessarily, however, correlated with the sound track beginning whereat they are positioned, inasmuch as the stylus for engaging the sound tracks may preferably be positioned around the periphery of the record remotely from a device for engaging the notches. In the illustrated embodiment, the notches are located in the vicinity of lead-in grooves 19, 20 so as to be less likely to interfere with a stylus being set into region 21.

Presentation Apparatus

The audio-visual presentation apparatus is contained in a cabinet 33. The cabinet 33 contains a viewing screen 34 onto which an image is projected from inside the cabinet 33. The cabinet 33 also contains an on/off and volume control knob 35, a focus control knob 36, a start/repeat switch lever 38, an access switch button 39, a speaker 40, and a response lever 42. The cabinet 33 may be opened for placement of a record 10 therein by turning latch knob 44 and lifting the top 46 of the cabinet 33.

On the inside of the cabinet 33 (FIGS. 9 through 14), a record 10 may be received on a turntable 48 and a platform 50. The turntable 48 contains pins 52, 53 for registration with the holes 30, 31 in the audio record portion 12. The platform 50 contains pins 54, 55 for registration with the holes 30, 31 in the visual record 14. The relative positions and sizes of the pins 52, 53, 54, 55 and holes 30, 31 assure that the visual display areas 22 are in a position for upright projection, notwithstanding which side of the record 10 is up and that the correlated sound tracks 16 and visual display areas 22 are initially positioned for simultaneous presentation.

The turntable 48 is positioned for rotation on bearing 56. The turntable 48 is rotated at a uniform rate by a turntable drive wheel 58 which turns in contact with the inside rim 59 of the turntable 48. The drive wheel 58 is in turn rotated by a turntable drive capstan 60. The turntable drive capstan 60 is rotated continuously by turntable drive motor 61 which is actuated when the presentation apparatus is turned on by turning the on/off and volume control knob 35 to an "on" position. The turntable drive wheel 58 is moved into contact with both the capstan 60 and the turntable rim 59 when a drive solenoid 62 is energized. When the drive solenoid 62 is deenergized, the force of a spring 63 moves the turntable drive wheel 58 out of contact with both the turntable rim 59 and the turntable drive capstan 60, and also moves a turntable braking means comprising a brake pad 64 into contact with the inside rim 59 causing the turntable 48 to cease rotating.

An audio message is reproduced by typical phonographic techniques from a sound track 16 of an audio record 12 on a rotating turntable 48 by means of an audio reproducing means comprising a tone arm 65 with a stylus 66 (FIG. 10) mounted at the end thereof for riding in the sound track 16, and an audio amplifier 68 which couples the tone arm 65 to the speaker 40. The tone arm 65 may be freely pivoted about a stationary mount 69.

The tone arm 65 is lifted from contact with the sound track 16 and the rotating turntable 48 is brought to a halt in accordance with the following. A sub-audible tone is recorded following the audio information on each sound track 16. This sub-audible tone is detected by a tone discriminating circuit 70 (FIG. 15) in the audio amplifier 68 whenever the stylus 66 reaches the end of the audio information on the sound track 16. When this sub-audible tone is so detected, power which is normally provided through the audio amplifier 68 on a line 71 to a tone arm solenoid 72 is temporarily interrupted, thereby causing the solenoid 72 to be deenergized, thereby raising the tone arm lift mechanism 74 to which the solenoid 72 is mechanically coupled. When raised, the tone arm lift mechanism 74 contacts the lower side of the tone arm 65 to lift the tone arm 65 from the sound track 16 and to then slide the tone arm 65 on the lift mechanism 74 to return the tone arm 65 to a starting position, with the stylus 66 above and near the periphery 18 of the record 10. When power to the tone arm solenoid 72 is interrupted, an SCR 77, which is connected in series with the tone arm solenoid 72, becomes non-conductive. Thus, the tone arm solenoid 72 is not reenergized upon the mere restoration of power on line 71 following the end of the detected sub-audible tone. The tone arm solenoid 72 is initially energized by depressing the start/repeat switch lever 38 (FIG. 2) to close the switch 38a (FIG. 15) to deliver a gating pulse to the SCR 77.

Figure 9:
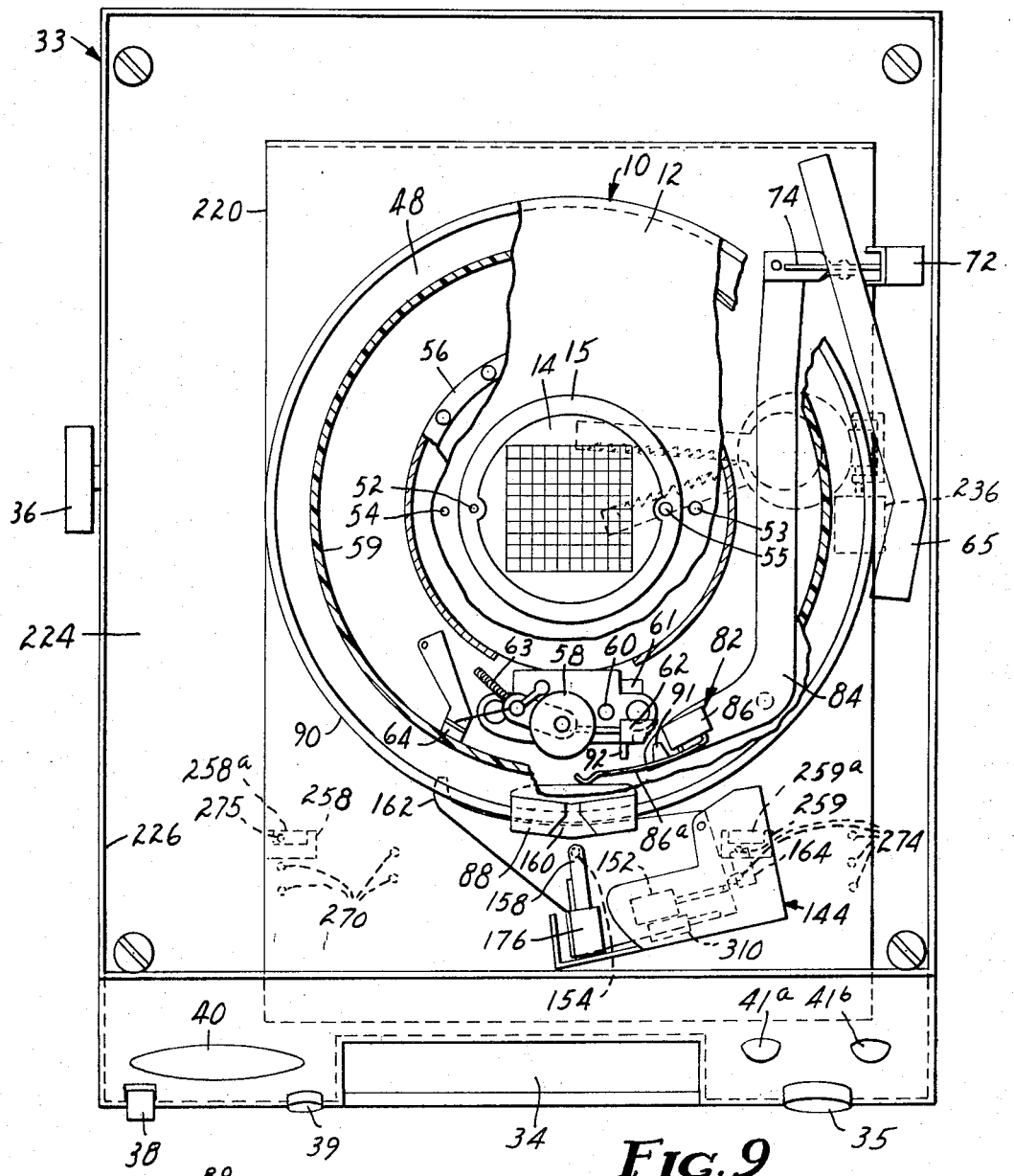
FIG. 9 is a sectional view of the interior of the audio-visual presentation apparatus taken along line 9—9 of FIG. 2, with certain portions broken away or omitted for purposes of clarity.
Figure 16:
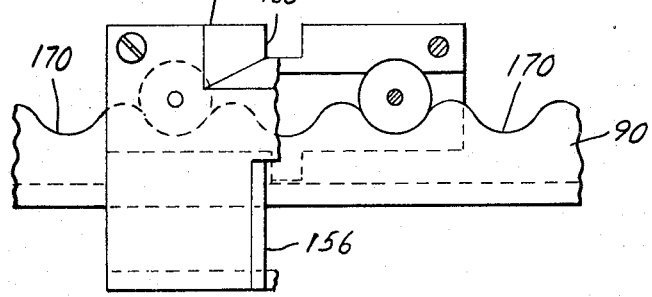
FIG. 16 is a fragmentary elevational view of the starting position marker in cooperation with the grooved outside rim of the turntable, with certain portions broken away for purposes of clarity.

The arm lift mechanism 74 is mechanically coupled to a detecting means 82 by linking arm 84 (FIGS. 9 and 14). The detecting means 82 is located at a so-called "-home position," having a fixed relationship to the audio reproducing means, for detecting when the rotating turntable 48 is at the position from which it started rotating. The detecting means 82 comprises a snap action switch 86 having an actuator arm 86a and a movable contact 86b (FIG. 15). When the arm lift mechanism 74 is raised, the motion of the linking arm 84 causes the detecting means 82 to be moved closer to the turntable 48 such that the actuator arm 86a is moved into the sweep region of a starting position marker 88 which rides seated in grooves of the fluted outside rim 90 of the turntable 48. Detail of the starting position marker 88 is shown in FIG. 16. When the starting position marker 88 contacts the actuator arm 86a of the switch 86, movable contact 86b is moved into position 86c. When the movable contact 86b is moved into position 86c, power is removed from the turntable drive solenoid 62, thereby removing rotational driving force from the turntable 48 and applying braking force adequate to accurately stop the turntable 48 at a definite location relative to the "home position" of the detecting means 82.

To assure that the switch actuator arm 86a maintains movable switch contact 86b in position 86c, a piece of permanent magnet material 91 on the linking arm 84 holds the actuator arm 86a in the position which it assumes upon being contacted by the starting position marker 88. The magnetic bond between the actuator arm 86a and the permanent magnet material 91 is broken only when the linking arm 84 moves the detecting means 82 away from the starting position marker 88 upon the tone arm 65 again being lowered. When the linking arm 84 is so moved, the actuator arm 86a pushes against a bump 92 on the turntable drive means and the magnetic bond is physically broken.

When the magnetic bond is thus broken, movable switch contact 86b returns to position 86d and the turntable drive solenoid is energized, thereby moving the turntable drive wheel 58 into contact with the capstan 60 and the turntable rim 59 to thereby uniformly rotate the turntable 48.

The visual information is reproduced onto the viewing screen 34 by typical projection techniques from the visual display areas 22 of the visual record 14 by means of a projection means comprising a lamp 93, a focusing lens assembly 94 and a reflecting mirror 96. The projection lamp 93 is attached to the cabinet top 46 and is thus moved out of the way for placing an audio-visual record 10 on the turntable 48 and platform 50 whenever the cabinet 33 is opened. The focusing lens assembly 94 may be raised or lowered by turning the focus control knob 36 which is connected to a gear 98. The gear 98 cooperates with a rack 99 on a shaft 100 which is connected to the focusing lens assembly 94. Light from the projection lamp 93 is focused through a single visual display area 22 of a received visual record 14, through the focusing lens assembly 94, and reflected from the mirror 96 onto the viewing screen 34.

Not all of the images contained in a visual display area 22 are projected onto the viewing screen 34. The image of section 25 which includes the operator response choices is projected onto a shutter 106 which is positioned between the reflecting mirror 96 and the lower portion of the viewing screen 34. The shutter 106 is moved out of the blocking position when a shutter solenoid 108 is energized, thereby enabling the image of section 25 to be projected onto the viewing screen 34. Power to the shutter solenoid 108 is furnished through an SCR 110 which is normally not conducting. However, when movable switch contact 86b is moved to position 86c upon the actuator arm 86a being contacted by the starting position marker 88, a pulse is delivered on line 111 to the gate of SCR 110 to render SCR 110 conductive, and to thereby energize the shutter solenoid 108. Thus, the shutter 106 is removed from the projection path and the image of section 25 including the operator response choices is then projected onto the lower portion of viewing screen 34.

If it is desired to have the audio information repeated before a response choice selection is made, one need only depress the start/repeat switch lever 38 to gate the SCR 77 and thereby reenergize the tone arm solenoid 72.

The selection means 112 includes a response lever 42, a photocell bank 113, a rack 114, a photocell shutter 115, slots 116, 117, 118 in the cabinet 33, and a momentary contact switch 119. When the response lever 42 is depressed in one of the slots 116, 117, 118, the photocell shutter 115 which is mounted on the response lever 42 is moved from its stationary position wherein it blocks projection of light onto the photocell bank 113, and the image of section 26 which includes the predetermined programs 27 is then projected into the region of photocell bank 113. The response lever 42 passes through a slot 120 in the photocell bank 113. The photocell bank 113 supports a sensing means comprising photocells 122, 124, 126, 128. As the response lever 42 is moved laterally to be in alignment with one of the slots 116, 117, 118 corresponding to a selected response choice, the photocell bank 113 is shifted within the rack 114 to be in alignment with the image of the predetermined program 27 corresponding to the selected response choice. When the response lever 42 is in the left position in alignment with the slot 116, the image of the program related to response choice number 1 (FIG. 6A) is projected onto the photocells 122, 124, 126, 128. When the response lever 42 is in the center position in alignment with the slot 117, the image of the program related to response choice number 2 is projected onto the photocell bank 113.

The lateral positioning of the response lever 42 is merely the first step in making the response choice selection. This selection does not become irrevocable until the response lever 42 is depressed into the slot 116, 117, 118 with which it 42 is aligned. It is only when the response lever 42 is so depressed to thereby move switch contact 119a to position 119b that a control means (FIG. 15) is programmed in accordance with the particular programming indicia 28, 29 of the program 27, the image of which is then being projected upon the photocells 122, 124, 126, 128.

The control means includes registering and gating means comprising SCRs 130, 132, 134, 136. The control means is programmed as follows. At the instant when the movable switch contact 119a is moved to position 119b, movable switch contact 138 is in position 138a so that power is supplied to each of the photocells 122, 124, 126, 128. Upon the switch contact 119a assuming position 119b, power is delivered through the coil of a control means solenoid 140 to the anodes of SCRs 132, 134, 136. The anode of the SCR 130 is connected to a source of 24-volt D.C. electrical power on line 141 when the movable switch contact 86b is in position 86c. The gates of SCRs 130, 132, 134, 136 are connected to the photocells 122, 124, 126, 128 respectively. When light is projected on a photocell 122, 124, 126, 128, the SCR 130, 132, 134, 136 connected thereto is then rendered conductive. SCR 130 controls the flow of current through, and therefore the state of, a direction setting switching means comprising a relay 142. The state of relay 142 determines the direction of movement of the turntable stepping means 144 and the platform stepping means 146 as they reposition the turntable 48 and the platform 50 for the next audio-visual presentation.

The states of the SCRs 132, 134, 136 determine the number of steps through which the turntable stepping means 144 and the platform stepping means 146 step during such repositioning. When the control means is programmed, the SCRs 132, 134, 136 register a count in accordance with the sensed first indicia 28.

Shortly after the control means is programmed by the gating of certain of the SCRs 130, 132, 134, 136 in accordance with the program image projected onto photocells 122, 124, 126, 128, the current flow through the control means solenoid 140 energizes this same solenoid 140 to move movable switch contact 138 to position 138a and to close switch 150. When movable switch contact 138 is moved to position 138a, power to the photocells 122, 124, 126, 128 is interrupted; and thus the SCRs 130, 132, 134, 136 cannot be further gated to thereby disturb their programmed condition.

The movement of movable switch contact 138 to position 138a also enables power to be maintained to the control means solenoid 140 and to the anodes of the SCRs 132, 134, 136 after the movable switch contact 119a is allowed to return to position 119c upon the release of the response lever 42. When the movable switch contact 119a is moved to position 119b, current flow through SCR 110 is interrupted. As a result, shutter solenoid 108 is deenergized, thereby allowing the shutter 106 to return to a light blocking position. The return of movable switch contact 119a to position 119c upon the release of the response lever 42 does not then reenergize the shutter solenoid 108 because the SCR 110 remains non-conducting until another gating pulse is received.

Upon the control means being programmed, the turntable stepping means 144 and the platform stepping means 146 are set into motion to re-position both the turntable 48 and the platform 50 for the next audio-visual presentation, which next presentation is, of course, in accordance with the response choice selected upon the lateral positioning of the response lever 42.

As noted above, switch 150 is closed in response to the energization of the control means solenoid 140 following the momentary movement of movable switch contact 119a to position 119b. Upon the switch 150 being closed, a turntable stepping means solenoid 152 is energized. Solenoid 152 is fixedly mounted relative to the turntable bearing 56. When energized, solenoid 152 causes the turntable stepping means 144 to move into a position wherein a turntable stepping tire 154 passes through an opening 156 in the starting position marker 88 to engage the outside of the fluted outside rim 90; and the starting position marker holder 158 moves into engagement with the yoke 160 in the starting position marker 88. When the turntable stepping means 144 moves into contact with the turntable 48, a protrusion 162 thereon moves the turntable brake pad 64 away from the inside rim 59 of turntable 48, thereby allowing the drive tire 154 to drive the turntable 48 in either direction.

In response to the turntable stepping means solenoid 152 being energized, a switch 164 mechanically coupled thereto is closed. The switch 164 is in series with a power terminal of a turntable stepping motor 166. The closure of the switch 164 causes power to be furnished to the turntable stepping motor 166; which motor 166 drives the turntable stepping tire 154 and thereby causes the turntable 48 to rotate.

The direction in which the turntable 48 is stepped is determined by the direction in which the turntable stepping motor 166 rotates, which is determined by the state of the relay 142. The relay 142 is illustrated (FIG. 15) in a state whereby the turntable 48 will be stepped in a counterclockwise direction. This corresponds to a rearward direction in the sequence of sound tracks 16 on the audio record 12.

The number of steps in which the turntable 48 is stepped is determined by the states of the control means register SCRs 132, 134, 136. A step is the rotational distance between the grooves 170 in the fluted outside rim 90 of the turntable 48. This rotational distance corresponds to the rotational distance between the sound track beginnings such as the lead-in grooves 20 at the periphery 18 of the audio record 12. Thus, to correspond to the audio record 12 which has fifty evenly spaced sound track beginnings, the fluted outside rim 90 has fifty evenly spaced grooves 170.

The starting position marker 88 rests in two grooves 170 of the fluted outside rim 90 when the turntable 48 is at rest. When the turntable 48 is stepped by the motor 166, the starting position marker 88 is held by the holder 158 in a stationary position relative to both the "home position" of the detecting means 82 and the tone arm 65. As the turntable 48 moves, however, the starting position marker 88 is elevated as it passes from one groove 170 to the next. Upon the elevation of the starting position marker 88, the holder 158 is pivoted about pivot 172 and the opposite end 174 thereof bears against actuators in momentary contact switches 176, 178 to operate both switches. The switch 178 is closed only when the holder 158 is raised to its highest elevation while the starting position marker 88 is midway between grooves 170. Switch 176, on the other hand, is open only while the starting position marker 88 is resting in the grooves 170. Switch 176, when closed, provides an additional current path from the 24-volt D.C. power line 141 to the turntable stepping means solenoid 152. The significance of this switch 176 will be discussed hereinafter.

Each momentary closing of the switch 178 causes a pulse to be delivered to a counter solenoid 180 which when energized rotates a step counter 182 one step. The step counter 182, illustrated in FIGS. 17A and 17B, constitutes the counting means.

The step counter 182 includes a disk-shaped counter cam 184 which is freely rotatable about a pin 186 and also slidable upon the pin 186. The pin 186 is firmly set in the frame 188 of the counter. An anti-back-up pawl 190 is mounted to the frame 188 and engages ratchet teeth 191 in the lower side of the cam 184. A ratchet pawl 192 is mounted to a ratchet collar 194 and also engages the ratchet teeth 191. The ratchet collar 194 is rotated about the pin 186 in response to each pulse received by the counter solenoid 180 upon each closing of the switch 178.

The counter cam 184 contacts the actuator arms 196, 198, 200 of three switches 196a, 198a, 200a, each of which is connected in series with one of the SCRs 136, 134, 132, respectively. These switches 196a, 198a, 200a are opened when their respective actuator arms 196, 198, 200 are deflected by the detents of the cam 184. The counter cam 184 is shaped to open the switch 196a during alternate rotational steps (beginning with the first step) of the cam 184; to open the switch 198a during only the durations including the second through third steps and the sixth through seventh steps of the cam 184; and to open the switch 200a during only the durations including the fourth through seventh steps of the cam 184. Therefore, the stepping of the step counter cam 184 produces a count as follows: The first step opens the switch 196a which opening represents a single binary count. The second step closes the switch 196a and opens the switch 198a which opening represents two binary counts. The third step leaves the switch 198a open and also opens the switch 196a again, which combination of open switches 196a, 198a represents three binary counts. The fourth step closes the switches 196a and 198a again and opens the switch 200a, which opening represents four binary counts, etc. — through the seventh count.

Each of the switches 196a, 198a, 200a has a small bleed resistor 202, 204, 206 of about 680 ohms, across its terminal. This resistance is sufficient to maintain register SCRs 132, 134, 136 in a conducting state through their minimum holding current of about 5 milliamps, even when their respective switches 200a, 198a, 196a are opened. 2 ½ ohm, 5-watt series resistors 207 are connected in series with the anode of each control device SCR 132, 134, 136, the switches 200a, 198a, 196a and the solenoid coil 140. The solenoid coil 140 is approximately 25 ohms. This combination assures that as long as at least one switch 200a, 198a, 196a in series with a conducting SCR 132, 134, 136 is closed, the holding current through the conducting SCRs 132, 134, 136 is the minimum necessary to hold SCRs 132, 134, 136 in a conducting state.

When the step counter 182 has stepped to a point where the stepped count equals the registered count, all of the switches 196a, 198a, 200a which are in series with a then conducting SCR are open simultaneously, and the only current path through the control means solenoid 140 would be through one or more of the 680 ohm resistors 202, 204, 206. The current which would flow through this path, however, would be inadequate to hold the control means solenoid 140 in its energized state. Therefore, the control means solenoid 140 is deenergized, thereby opening the circuits to the SCR anodes. This terminates conduction through the SCRs 132, 134, 136 and thereby resets the register.

Figures 17A, 17B:
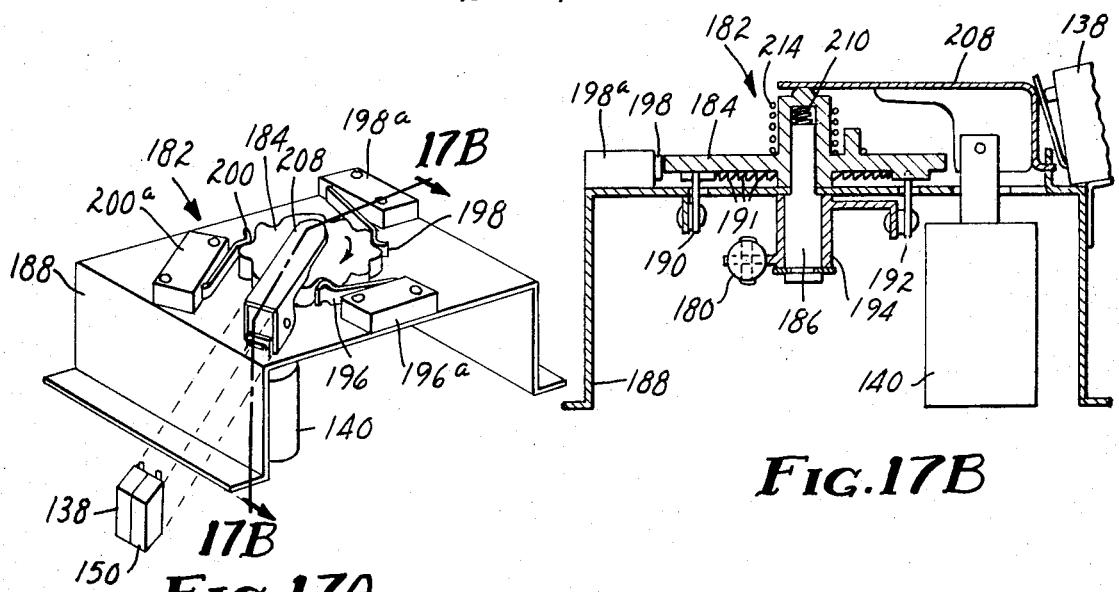
FIG. 17A is a perspective view of the step counter, with a portion displaced for purposes of clarity.
FIG. 17B is a sectional view of the step counter taken along line 17B—17B of FIG. 17A.

The control means solenoid 140 is included in the assembly of the step counter 182 (FIGS. 17A and 17B). When the control means solenoid 140 is deenergized, an arm 208 is raised, thereby allowing the counter cam 184 to be raised by the force of a compression spring 210 to the point where the anti-back-up pawl 190 becomes disengaged from the ratchet teeth 191. Upon such disengagement, the cam 184 is returned by the force of a helical torsion spring 214 to its starting position.

When the arm 208 is raised, it contacts the actuator arms for switches 138 and 150 and thereby returns movable switch contact 138 to position 138b and opens the switch 150. When switch 150 is opened, current is nevertheless provided through switch 176 to the turntable stepping means solenoid 152 to maintain the operation of the turntable stepping motor 166 until the last step is completed. Upon the completion of the last step, the starting position marker 88 settles in the groove 170 and the switch 176 is opened to terminate the operation of the turntable stepping motor 166.

To return in the sequence of operation to the period while the turntable 48 is being re-positioned in accordance with the programmed states of the SCRs 132, 134, 136, repositioning of the platform 50 is then also taking place.

Figure 10:
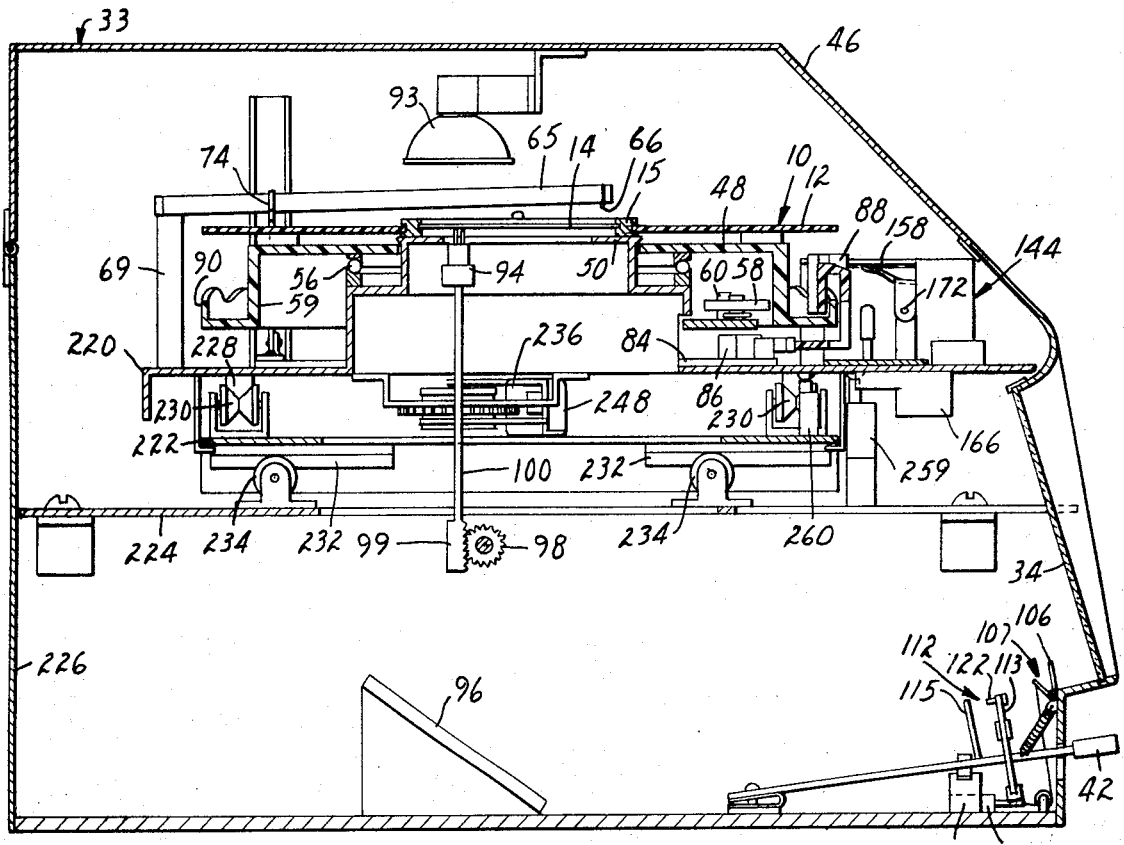
FIG. 10 is a sectional view of the interior of the audio-visual presentation apparatus taken along line 10—10 of FIG. 2, with certain portions omitted for purposes of clarity.
Figure 13:
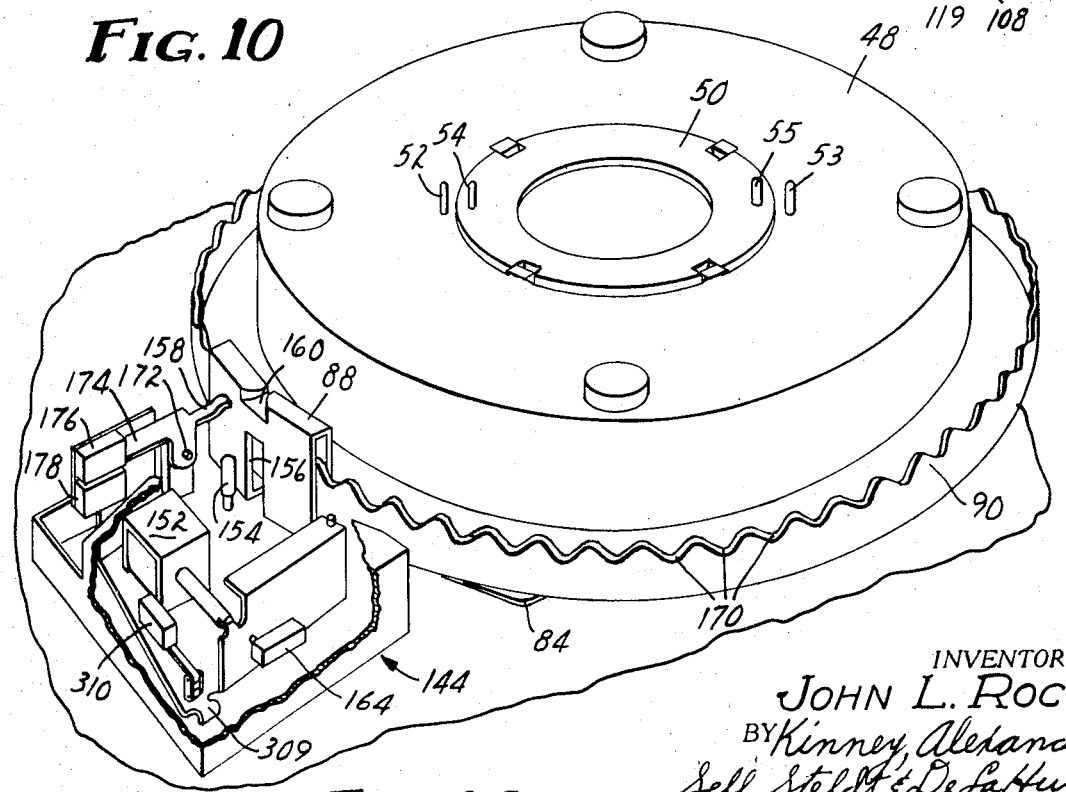
FIG. 13 is a perspective view of the turntable in cooperation with the turntable stepping means, with certain portions broken away for purposes of clarity.
Figure 11:
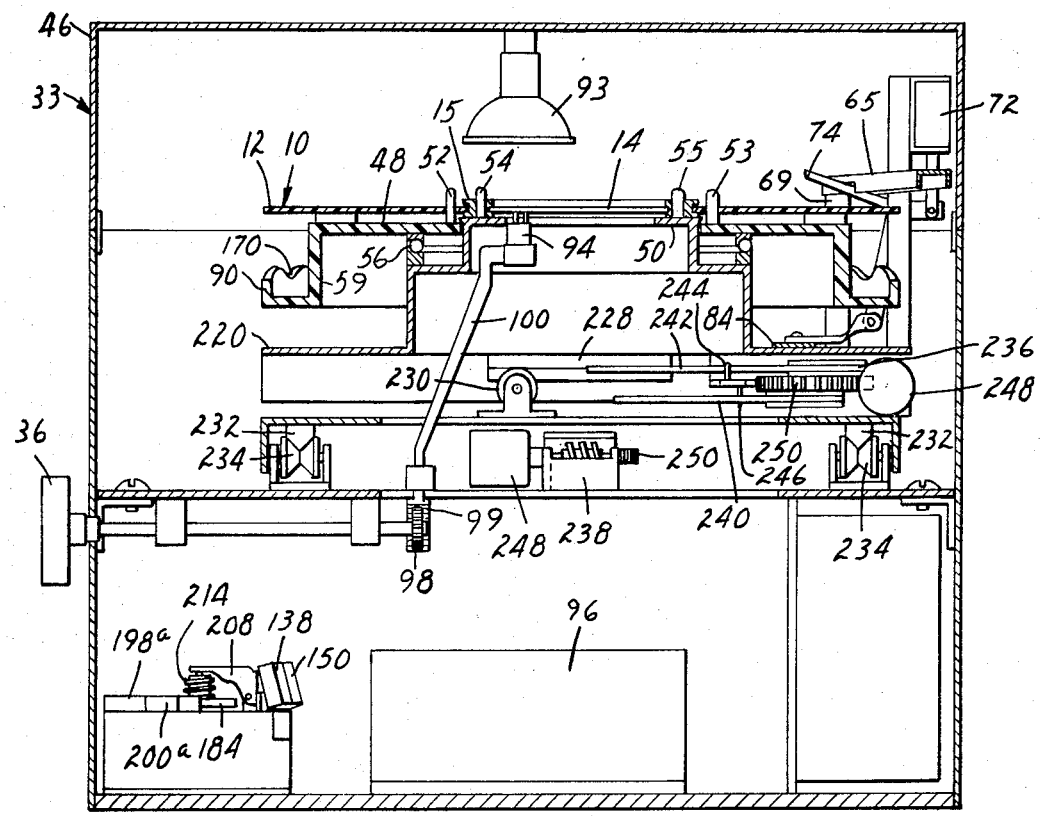
FIG. 11 is a sectional view of the interior of the audio-visual presentation apparatus taken along line 11—11 of FIG. 2, with certain portions omitted for purposes of clarity.

Referring to FIGS. 10, 11 and 14, the platform 50 and the turntable 48 are both mounted on a carriage 220. The carriage 220 is movably supported for bidirectional movement on a carriage plate 222, which in turn is supported for bidirectional movement on a base plate 224. The base plate 224 is fixedly mounted to the cabinet chassis 226.

The bidirectional movements are parallel to the two perpendicular paths corresponding to the X-Y matrix of fifty visual display areas 22 so that the carriage 220 may be positioned to place any of the visual display areas 22 of a visual record 14 received by the platform 50 in the light path from the projection lamp 93. These movements are in five rows having ten spaces each.

The carriage 220 contains rails 228 which slide on rollers 230 mounted on the carriage plate 222 in order to enable movement in an X direction. The carriage plate 222 contains rails 232 which slide on rollers 234 mounted on the base plate 224 in order to enable movement in a Y direction.

Movement of the carriage 220 along the paths defined by the rails 228, 232 and rollers 230, 234 is accomplished by operation of the platform (or carriage) stepping means 146 which comprises X axis stepping means 236 and Y axis stepping means 238. Both the X and Y axes stepping means 236, 238 (FIG. 18) contain a pair of serrated arms 240, 242, which serrated arms cooperate with pins 244, 246 fixedly mounted to the underside of the carriage 220 (or the carriage plate 222).

When a drive means comprising a motor 248 operates in one direction in response to current flow therethrough in a first direction, a gear wheel 250 rotates in a clockwise direction and the serrated arm 240, which is eccentrically mounted on the gear wheel 250, swings into position to grip the pin 244 and to thereby pull the pin 244 and the carriage 220 (or carriage plate 222) in a direction toward the motor 248. When the motor 248 operates in the opposite direction in response to current flow therethrough in a second direction, the gear wheel 250 rotates in a counterclockwise direction and the other serrated arm 242, which is also eccentrically mounted on the gear wheel 250, swings into position to grip the pin 246 and to thereby push the pin 246 and the carriage 220 (or carriage plate 222) in a direction away from the motor 248. The spacing of the teeth on the serrated arms 240, 242 is such that for each rotation of the motor 248 the carriage 220 (or carriage plate 222) is moved a distance equal to the distance between the visual display areas 22. The serrated arms 240, 242 are kept within the region of the pin 244 by the stops 252 mounted on the carriage 220 (or carriage plate 222).

The operation of the X and Y axes stepping means 236, 238 is synchronized with the operation of the turntable stepping motor 166. As the turntable 48 is stepped by the turntable stepping motor 166, movable momentary contact switch 178 is momentarily closed during each step and a starting pulse is delivered to either the X axis motor 248a or the Y axis motor 248b in the platform positioning circuit 254. The particular one of the two motors 248a, 248b which rotates and the direction of the rotation is determined by the setting of the direction setting switching means (relay 142) and the settings of a first switching means comprising switches 256, 257, a second switching means comprising switches 258, 259, and a third switching means comprising a switch 260.

The setting of the relay 142 determines the direction of operation of the X axis and Y axis drive motors 248a, 248b. In FIG. 15, the relay movable contacts 142a, 142b are shown in the reverse direction.

The positions of the switches 256, 257 determine the direction of operation of the X axis drive means depending on whether an odd numbered or an even numbered row of the visual display area matrix is detected in position for projection. In FIG. 15, the movable contacts of switches 256, 257 are shown in positions assumed when an odd numbered row of the visual display area matrix is detected in position for projection. The detection of whether an odd or even row of the visual display area matrix is in position for projection is accomplished by the interaction between switch actuator arm 256 and cams 266 located on the lower side of the carriage plate 222. When a cam 266 is in the position over the actuator arm 256a an odd row is detected in position for projection and the movable contacts of switches 256, 257 are thrown to the positions 256b and 257b as shown in FIG. 15. When none of the cams 266 are over the actuator arm of the switch assembly 268, the movable contacts of switches 256, 257 are moved to positions 256c and 257 c, respectively, which means that an even numbered row in the visual display area matrix is then detected in position for projection.

The positions of the switches 258, 259 determine whether the X axis drive motor 248a or the Y axis drive motor 248b will be actuated when an end position in a row of the visual display area matrix is detected in position for projection. The detection of whether the platform is in position for projection from a first position or a last position in a row is accomplished by the interaction between switch actuator arms 258a, 259a and cams 270 and 274 respectively. Bearing in mind that the forward sequence for projection of the visual display areas 22 is one beginning in the upper left hand corner of the first row, thence proceeding along the X axis through the ten positions of the first row, thence proceeding one position along the Y axis to the second row, thence proceeding in the opposite direction along the X axis to the last position in the second row, thence proceeding one position along the Y axis to the first position in the third row, thence proceeding in the first position along the X axis to the last position in the third row, etc. (see FIG. 4); when the carriage 220 is positioned so that the first position in the first row of visual display areas is in position for projection, cam 275 depresses the actuator arm 258a of switch 258 and the actuator arm 259a of switch 259 is not depressed. In this position, cams 270 and switches 258, 259 are as shown in FIG. 9. Whenever any of the cams 274 contact the actuator arm 259a of switch 259, the movable contact of switch 259 is in position 259b shown in FIG. 15. At the same time, none of the cams 270 (FIG. 14) are contacting the actuator arm 258a of switch 258 and the movable contact of switch 258 is in position 258b shown in FIG. 15. Switches 258, 259 assume these positions 258b, 259b whenever a last position of any row in the visual display area matrix is in detected position for projection. Whenever the carriage 220 is next stepped along the Y axis, one of the cams 270 contacts and depresses the actuator arm 258a of the switch 258 to move the movable contact of switch 258 into position 258c and none of the cams 274 contact the actuator arm 259a of switch 259, thereby allowing the movable contact of switch 259 to assume position 259c. Whenever switches 258, 259 are in positions 258c and 259c, respectively, the carriage 220 is positioned with a first visual display area of a row of the given display area matrix in position for projection.

The position of switch 260 determines whether current will flow through either of switches 258, 259 to the X axis or Y axis drive motors 248a, 248b or whether current will flow through only the X axis drive motor 248a in accordance with whether the platform is detected in position for enabling projection from an end of the row position of the matrix. When the carriage 220 is in an end-of--the-row position, current flow is switched through either of switches 258, 259 to the X or Y axes drive motors 248a, 248b. When the carriage 220 is in other than an end-of-the-row position, i.e., a mid-row position, current flow is switched through only the X axis drive motor 248a. The movable contact of switch 260 is shown in FIG. 15 in a position 260a corresponding to an end-of-the-row position which occurs when either of a pair of cams 278 contact and depress the actuator arm 260b of the switch 260. Otherwise, the movable contact of switch 260 is in position 260c.

The platform positioning circuit 254 further comprises a fourth switching means comprising the momentary contact switch 178, and fifth and sixth switching means comprising switches 262, 264. The switch 178 is connected in the platform positioning circuit to momentarily switch current through the switch 260 to either the X or Y axes motors 248a, 248b each time switch 178 is closed, for each step of the turntable 48 by the turntable stepping motor 166. This momentary flow of current through the switch 178 thus causes either the X axis drive motor 248a or the Y axis drive motor 248b to move from a rest position. Once either motor 248a, 248b moves from its rest position, either switch 262 or 264 is moved from position a to position b to maintain the operation of the motor 248a, 248b through the remainder of one cycle of operation.

Whenever the drive motors 248a, 248b are at rest, the switches 262, 264 are in the positions 262a, 264a shown in FIG. 15. However, upon the operation of either drive motors 248a, 248b, the movable contact of the switch 262 or 264, respectively, is moved to position 262b or 264b, respectively, in response to a cam 282 on the same shaft as the gear wheel 250 moving from contact with an actuator arm 262c (or 264c, not numbered in FIG. 18) of the snap action switch 262 (or 264). The cam 282 associated with each motor 248 is shaped so that when the gear 250 has completed one complete revolution the cam 282 again contacts the actuator arm 262c of the snap action switch 262 (or 264) to return the switch 262 (or 264) to position 262a (or 264a) as shown in FIG. 15.

Figure 19:
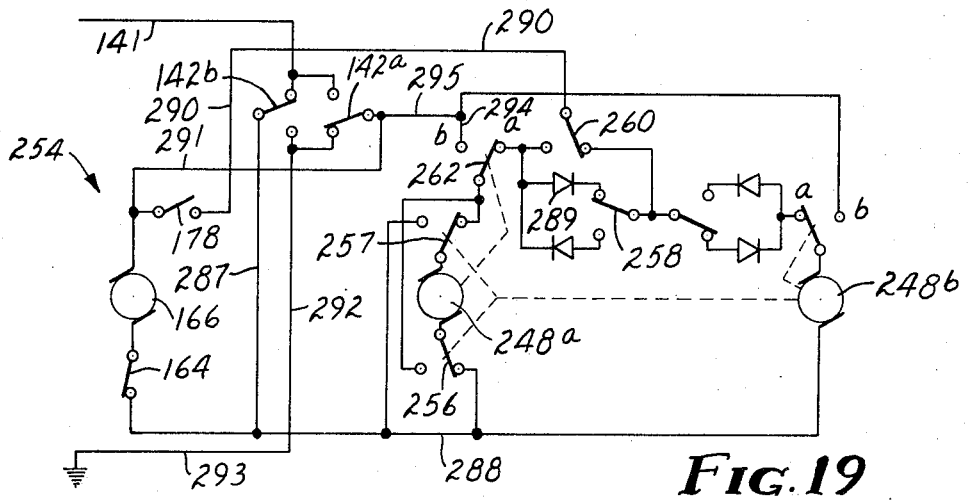
FIG. 19 is a schematic diagram of the platform positioning control circuit (included in FIG. 15) in a given condition of operation.

Referring to FIG. 19, operation of the platform positioning control circuit 254 is described for the condition when the last position in the first row of the visual display area matrix (visual display area number 10) is in position for projection and the control means is programmed to enable movement one position in reverse in the visual display area sequence. Upon the turntable stepping motor 166 operating to step the turntable 48 one position, switch 178 is momentarily closed, thereby switching current flow from the D.C. source voltage line 141, through the movable relay contact 142b, through line 287 and line 288, through switch 256, through the X axis drive motor 248a, through the switch 257, through the switch 262, through diode 289, through switch 258, through switch 260, along line 290, through switch 178, along line 291, through the movable relay contact 142a, and through and along line 292 to the ground terminal line 293, thereby driving the X axis drive motor 248a in a reverse direction to place visual display area number 9 in position for projection.

Once the X axis drive motor 248a commences operation, the movable contact of switch 262 is thrown to position 262b and current flow from switch 262 proceeds directly along lines 294 and 295 to the movable relay contact 142a.

Figure 20:
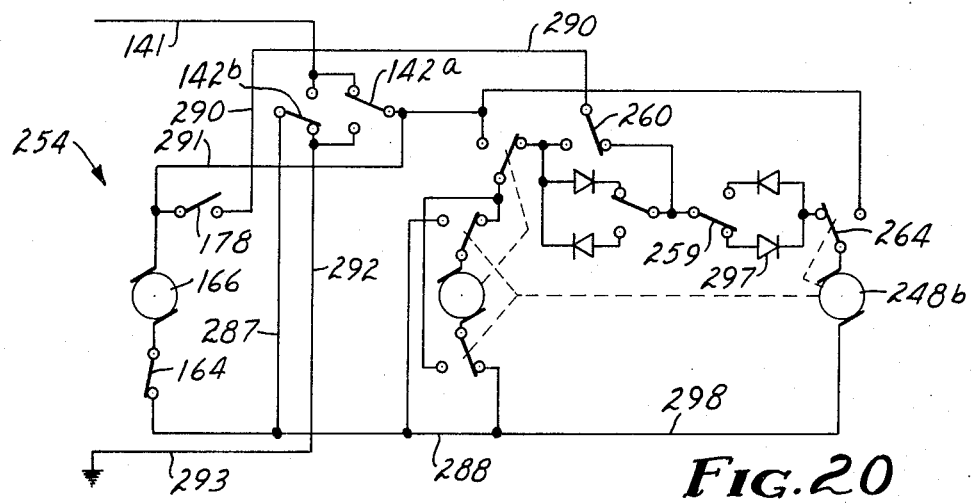
FIG. 20 is a schematic diagram of the platform positioning control circuit (included in FIG. 15) in a given condition of operation.

Referring to FIG. 20, when the carriage 220 is in the same position (that is, the position for projecting the image of visual display area 10) but a forward movement in the sequence is indicated, the movable contacts 142a, 142b of the relay 142 are switched to the positions shown and the operation of the circuit is as follows. Upon switch 178 being closed, current flows from D.C. voltage source line 141 through the movable relay contact 142a, through line 291, through the switch 178, along line 290, through switch 260, through switch 259, through diode 297, through switch 264, through Y axis drive motor 248b, along lines 298, 288, and 287, through the movable relay contact 142b, and along line 292 to the ground terminal line 293.

Figure 21:
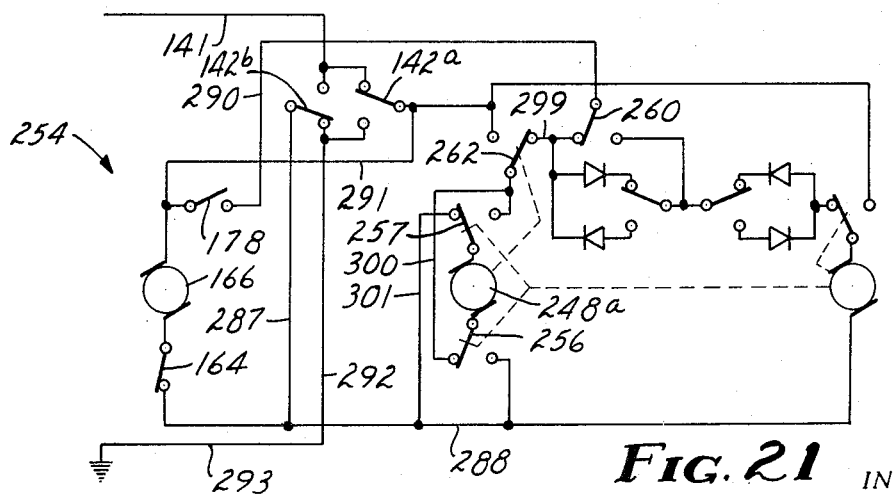
FIG. 21 is a schematic diagram of the platform positioning control circuit (included in FIG. 15) in a given condition of operation.

Referring to FIG. 21, when the carriage 220 is in position for projecting through a mid-position display area of an even row and a forward movement in the sequence is indicated, operation is as follows. Upon switch 178 being closed, current flows from D.C. source voltage line 141 through the movable relay contact 142a, along line 291, through switch 178, along line 290, through switch 260, along line 299, through switch 262, along line 300, through switch 256, through the X axis drive motor 248a, through switch 257, along line 301, and along lines 288 and 287, through the movable relay contact 142b, and along line 292 to ground terminal line 293.

From the foregoing description of the operation of the platform positioning circuit 254, the operation of this circuit under other conditions should be readily apparent. As an aid to understanding the operation of this circuit when the carriage 220 is in various positions, the following table provides the settings of the switches 256, 257, 258, 259, 260 when the carriage is in these various positions.

| Position of carriage corresponding to position in visual display area matrix | Switch Positions | | | |
| --- | --- | --- | --- | --- |
| | 256 / 257 | 258 | 259 | 260 |
| First Position in odd row | b | c | c | a |
| Mid Position in odd row | b | b | c | b |
| Last Position in odd row | b | b | b | a |
| First Position in even row | c | c | c | a |
| Mid Position in even row | c | b | c | b |
| Last Position in even row | c | b | b | a |

When a program wherein the first indicia 28 are all darkened, thereby indicating "zero" steps, is sensed by the photocells 124, 126, 128 upon depression of the response lever 42, a signal is delivered on a line 304 from the control means solenoid 140 through integrating circuit 306 to provide a gating pulse on a line 308 to the SCR 77. Upon the SCR 77 being gated into a conducting state, the tone arm solenoid 72 is energized to operate the tone arm lift mechanism 74 to lower the tone arm 65 onto the audio record 12 to repeat the presentation of the audio information. A signal is delivered on the line 304 from the control means solenoid 140 only when all of the first indicia 28 are darkened. Otherwise, one of the photocells 124, 126, 128 delivers a gating pulse to its respective SCR 132, 134, 136 and line 304 is thereby grounded.

In one preferred embodiment wherein the audio record 12 contains notches 32a, 32b, 32c about the periphery 18 correlated to the beginnings of the sequentially first sound tracks, the control means further includes a notch detector switching means 312 (shown in FIGS. 8 and 15 only) and an access switching means. The notch detector switching means 312 is supported on the carriage 220 such that the actuator arm 312a may be moved into position for contacting the periphery 18 of a received audio record 12. When the actuator arm 312a contacts a notch having the configuration of the notch 32a in the periphery 18 while the audio record 12 is being stepped counterclockwise with the face of the record shown being "up," the switch 312 is opened from its normally closed position (FIG. 15). The access switching means comprises an access switch 39a and a solenoid 314 and a switch 315 which is closed when the solenoid 314 is energized. When the access switch button 39 is depressed, the switch 39a is closed, thereby energizing relay 314 to close a switch 315 and to also move the notch detector switching means mounted on an arm 316 into position for contacting the record periphery 18. So long as the switch 312 is also closed, the turntable stepping means solenoid 152 is energized and stepping of the turntable 48 and of the carriage 220 is effected until the actuator arm 312a detects and is positioned in a notch such as the notch 32a. Switch 312 is then thereby opened to deenergize solenoid 314, thereby opening the switch 315 and moving the notch detector switching means from engagement with the record periphery 18. The stepping is in a reverse direction because the photocell shutter 151 is in position to prevent the photocell 122 from sensing any projected second indicia 29, and thereby maintains the relay 142 set for determining a reverse stepping sequence. Therefore, upon the completion of this stepping of the turntable 48 and the carriage 220 in response to the operation of the access switch, the first sound track and correlated visual display of the adjacent previously sequenced group of correlated sound tracks and visual display areas is again moved into position for presentation of information therefrom. Because the positions of sequentially first sound tracks on one side of the record do not necessarily correspond to sequentially first sound track positions on the "flip" side, the notches 32a are "saw-tooth" shaped to provide a ratchet-type directional cooperation between the actuator arm 312a and the notches 32a. When the record 12 is "flipped" over, notches having a configuration such as the notch 32b (which is correlated to a sequentially first sound track on the "-flip" side) then cooperate with the actuator arm 312a in a like manner. Rectangular-shaped notches such as the notch 32c are correlated to sequentially first sound tracks on opposite sides of the record which have corresponding positions. Thus, the notch 32c will cooperate with the actuator arm 312a when either side of the record is "up."

The control means further includes indicator lights 41a and 41b which are connected to the turntable stepping motor 166 to indicate whether the turntable 48 is being stepped in directions corresponding to forward or reverse directions in the sequence of sound tracks and visual display areas. In an embodiment wherein forward movement in the sequence corresponds to a correct response choice selection and reverse movement corresponds to an incorrect response choice selection, these lights 41a, 41b, or some other indicating means or a recording means connected in parallel therewith, could be used to indicate or record the correctness of the response choice selections.

Again referring to FIG. 15, when the control means solenoid 140 is deenergized upon the completion of the operations of the turntable stepping means 144 and the platform stepping means 146, the turntable stepping means solenoid 152 is also deenergized. Upon deenergization, the solenoid 152 causes the turntable stepping tire 154 to move away from and to become disengaged from the turntable 48 and also causes the starting position marker holder 158 to move away from and become disengaged from the starting position marker 88. Upon the movement of the turntable stepping tire 154 away from the turntable 48, a cam 309 fixedly mounted relative to the turntable stepping tire 154 contacts and momentarily closes a pulse switch 310 positioned in a stationary position relative to the carriage 220. The pulse switch 310 then delivers a gating pulse on line 308 to the SCR 77 to thereby reenergize tone arm solenoid 72. When the tone arm solenoid 72 is reenergized, the tone arm lift mechanism 74 operates to lower the tone arm 65 onto the audio record 12. In response to the operation of the tone arm lift mechanism 74, the movable switch contact arm 86 b is moved to position 86d, which in turn causes the turntable drive wheel 58 to make contact with the turntable rim 59 and the capstan 60 to thereby rotate the turntable 48. The presentation, response choice selection, and positioning cycle is then repeated.

What I claim is:

1. An audio-visual system for presenting correlated audio and visual information, comprising
 a thin audio-visual record medium comprising
   an audio record including in a predetermined sequence a plurality of sound tracks containing recorded audio information, each sound track having a beginning at a given position near the periphery of the audio record, which sound track beginnings are placed about the periphery of the audio record at predetermined intervals, and
   a visual record including a plurality of spaced visual display areas containing projectable visual information, each of which visual display areas contains information correlated with a said sound track, and which visual display areas are positioned in a predetermined sequence corresponding to the predetermined sequence of sound tracks; and
 an audio-visual presentation apparatus comprising
   a chassis;
   receiving means supported by the chassis for receiving the audio-visual record medium,
   audio reproducing means supported by the chassis and positioned for engaging a said sound track of said received audio record for reproducing and thereby presenting the audio information therefrom;
   projection means supported by the chassis and positioned for projecting and thereby presenting an image of visual information from a said visual display area of said received visual record onto a viewing screen; and
   positioning means supported by the chassis for relatively positioning the audio reproducing means and the audio record for enabling the audio reproducing means to engage the beginning of any of said sound tracks distributed about the periphery of said received audio record, and for relatively positioning the projection means and the visual record for enabling projection onto said viewing screen of an image of visual information from any of said visual display areas of said received visual record;
   wherein each of a plurality of said correlated visual display area and sound track combinations includes a given number of predetermined response choices related to said correlated audio and visual information;
   wherein each of said plurality of visual display areas includes a given number of projectable predetermined programs, each program individually relating a said predetermined response choice to a predetermined correlated visual display area and sound track combination;
   wherein the projection means is capable of projecting said one or more predetermined programs from said received visual record; and
   wherein the audio-visual presentation apparatus further comprises
     selection means for enabling an operator to select one of said given number of predetermined response choices,
     sensing means responsive to the operation of the selection means for sensing the one of said projectable predetermined programs which is related to said selected response choice, and
     control means responsive to the operation of the selection means for controlling the positioning means in accordance with said sensed predetermined program to present said predetermined correlated visual display area and sound track combination related to said selected predetermined response choice.

2. An audio-visual system according to claim 1, audio reproducing means supported by the chassis and positioned for engaging a said sound track of said received audio record for reproducing and thereby presenting the audio information therefrom;

projection means supported by the chassis and positioned for projecting and thereby presenting an image of visual information from a said visual display area of said received visual record onto a viewing screen; and positioning means supported by the chassis for relatively positioning the audio reproducing means and the audio record for enabling the audio reproducing means to engage the beginning of any of said sound tracks distributed about the periphery of said received audio record, and for relatively positioning the projection means and the visual record for enabling projection onto said viewing screen of an image of visual information from any of said visual display areas of said received visual record;

wherein each of a plurality of groups of adjacent sound tracks comprises sound tracks containing related information, with one sound track in each group being the sequentially first sound track for that group;

wherein the audio record further comprises notches about the periphery of the audio record at positions corresponding to the beginnings of said sequentially first sound tracks; and wherein the control means further comprises
a notch detector switching means positioned for detecting notches in the periphery of said received audio record, and an access switching means enabled by the notch detector switching means for effecting relative motion between the audio record and the audio reproducing means and between the visual record and the projection means until a notch is detected, to thereby move a said sequentially first sound track and correlated visual display area into position for enabling presentation of audio and visual information therefrom.

20. For use in an audio-visual system for presenting corresponding audio and visual information, a thin audio-visual record medium comprising an audio record including in a predetermined sequence a plurality of sound tracks containing recorded audio information, each sound track having a beginning at a given position near the periphery of the audio record, which sound track beginnings are placed about the periphery of the audio record at predetermined intervals; and a visual record including a plurality of spaced visual display areas containing projectable visual information, each of which visual display areas contains information correlated to a said sound track, and which visual display areas are positioned in a predetermined sequence corresponding to the predetermined sequence of sound tracks;

wherein each of a plurality of said correlated visual display area and sound track combinations includes a given number of predetermined response choices related to said correlated audio and visual information; and wherein each of said plurality of visual display areas includes a given number of projectable predetermined programs, each program individually relating a said predetermined response choice to a predetermined correlated visual display area and sound track combination.

21. An audio-visual record medium according to claim 20, wherein each of the projectable predetermined programs of a given visual display area includes first indicia for indicating the number of sound tracks in the sequence of sound tracks and the number of visual display areas in the sequence of visual display areas that said predetermined correlated visual display area and sound track combination related to said predetermined response choice by said program is placed from the given visual display area and its correlated sound track.

22. An audio-visual record medium according to claim 21, wherein each of the projectable predetermined programs of said given visual display area further includes second indicia for indicating the direction in the sequences of sound tracks and visual display areas that said predetermined correlated sound track-visual display area combination related to said predetermined response choice by said program is placed from the given visual display area and its correlated sound track.

23. For use in an audio-visual system for presenting corresponding audio and visual information, a thin audio-visual record medium comprising an audio record including in a predetermined sequence a plurality of sound tracks containing recorded audio information, each sound track having a beginning at a given position near the periphery of the audio record, which sound track beginnings are placed about the periphery of the audio record at predetermined intervals; and a visual record including a plurality of spaced visual display areas containing projectable visual information, each of which visual display areas contains information correlated to a said sound track, and which visual display areas are positioned in a predetermined sequence corresponding to the predetermined sequence of sound tracks;

wherein the plurality of visual display areas are arranged in a matrix containing $m$ rows of $n$ visual display areas; and wherein the sequence of visual display areas corresponds to the sequence of sound tracks in a manner wherein a first visual display area at one end of a first row of the matrix correlates with a first sound track, and the successive visual display areas following a path, beginning with said first visual display area and continuing in a first direction along the first row to the $n$th visual display area of the first row, thence to adjacent visual display area in a predetermined adjacent row, which adjacent visual display area is the first visual display area of the predetermined adjacent row, thence in a second direction opposite to the first direction along the second row, respectively correlate with successive sound tracks distributed about the periphery in a predetermined direction beginning with the first sound track.

24. For use in an audio-visual system for presenting corresponding audio and visual information, a thin audio-visual record medium comprising
- an audio record including in a predetermined sequence a plurality of sound tracks containing recorded audio information, each sound track having a beginning at a given position near the periphery of the audio record, which sound track beginnings are placed about the periphery of the audio record at predetermined intervals; and
- a visual record including a plurality of spaced visual display areas containing projectable visual information, each of which visual display areas contains information correlated to a said sound track, and which visual display areas are positioned in a predetermined sequence corresponding to the predetermined sequence of sound tracks;
- wherein each of a plurality of groups of adjacent sound tracks comprises sound tracks containing related information, with one sound track in each group being the sequentially first sound track for that group; and
- wherein the audio record further comprises notches about the periphery of the audio record at positions corresponding to the beginnings of said sequentially first sound tracks.

25. For use in an audio-visual system for presenting corresponding audio and visual information, a thin audio-visual record medium comprising
- an audio record including in a predetermined sequence a plurality of sound tracks containing recorded audio information, each sound track having a beginning at a given position near the periphery of the audio record, which sound track beginnings are placed about the periphery of the audio record at predetermined intervals; and
- a visual record including a plurality of spaced visual display areas containing projectable visual information, each of which visual display areas contains information correlated to a said sound track, and which visual display areas are positioned in a predetermined sequence corresponding to the predetermined sequence of sound tracks;
- wherein each sound track beginning has two legs, with each leg positioned close to a leg of an adjacent sound track beginning.

26. An audio-visual presentation apparatus for presenting correlated audio and visual information from a thin audio-visual record medium comprising
- an audio record including in a predetermined sequence a plurality of sound tracks containing recorded audio information, each sound track having a beginning at a given position near the periphery of the audio record, which sound track beginnings are placed about the periphery of the audio record at predetermined intervals; and
- a visual record including a plurality of spaced visual display areas containing projectable visual information, each of which visual display areas contains information correlated with a said sound track, and which visual display areas are positioned in a predetermined sequence corresponding to the predetermined sequence of sound tracks;
- wherein each of a plurality of said correlated visual display area and sound track combinations includes a given number of predetermined response choices related to said correlated audio and visual information; and
- wherein each of said plurality of visual display areas includes a given number of projectable predetermined programs, each program individually relating a said predetermined response choice to a predetermined correlated visual display area and sound track combination;
- which audio-visual presentation apparatus comprises a chassis;
- receiving means supported by the chassis for receiving the audio-visual record medium,
- audio reproducing means supported by the chassis and positioned for engaging a said sound track of said received audio record for reproducing and thereby presenting the audio information therefrom;
- projection means supported by the chassis and positioned for projecting and thereby presenting an image of visual information from a said visual display area of said received visual record onto a viewing screen, and for projecting said one or more predetermined programs from said received visual record; and
- positioning means supported by the chassis for relatively positioning the audio reproducing means and the audio record for enabling the audio reproducing means to engage the beginning of any of said sound tracks distributed about the periphery of said received audio record, and for relatively positioning the projecting means and the visual record for enabling projection onto said viewing screen of an image of visual information from any of said visual display areas of said received visual record;
- selection means for enabling an operator to select one of said given number of predetermined response choices;
- sensing means responsive to the operation of the selection means for sensing the one of said projectable predetermined programs which is related to said selected response choice; and
- control means responsive to the operation of the selection means for controlling the positioning means in accordance with said sensed predetermined program to present said predetermined correlated visual display area and sound track combination related to said selected predetermined response choice.

* * * * * second direction opposite to the first direction when the platform is in a position for enabling projection from an even row, and a second switching means for switching current flow through the X axis drive means when the platform is in a position for enabling projection from an nth position in a row while the platform stepping means is set by the direction setting switching means for stepping the platform in a reverse direction or when the platform is in a position for enabling projection from a first position in a row while the platform stepping means is set by the direction setting switching means for stepping the platform in a forward direction, and for switching current flow through the Y axis drive means when the platform is in a position for enabling projection from an nth position in a row while the platform stepping means is set by the direction setting switching means for stepping the platform in a forward direction or when the platform is in a position for enabling projection from a first position in a row while the platform stepping means is set by the direction setting switching means for stepping the platform in a reverse direction.

11. An audio-visual system according to claim 10, wherein the control means further comprises a third switching means for switching current flow to the X and Y axes drive means through the second switching means when the platform is in a position for enabling projection from either end of a row and for switching current flow by-passing the second switching means and through the X axis drive means when the platform is not in a position for enabling projection from either end of a row.

12. An audio-visual system according to claim 11, wherein the control means further comprises a fourth switching means for momentarily enabling current flow through the X and Y axes drive means a number of times corresponding to the number of steps that the stepping means should step in accordance with the first indicia of said sensed predetermined program.

13. An audio-visual system according to claim 12, wherein each of the X and Y axes drive means, when actuated, moves from a rest position and causes the platform stepping means to step the platform one step during a cycle of operation which is completed upon the actuated drive means returning to the rest position; and wherein the control means further comprises a fifth switching means actuated by the X axis drive means, when the X axis drive means is not in the rest position, for switching current flow through the X axis drive means to maintain the cycle of operation of the X axis drive means until the completion of said cycle, and a sixth switching means actuated by the Y axis drive means, when the Y axis drive means is not in the rest position, for switching current flow through the Y axis drive means to maintain the cycle of operation of the Y axis drive means until the completion of said cycle.

14. An audio-visual system for presenting correlated audio and visual information, comprising a thin audio-visual record medium comprising an audio record including in a predetermined sequence a plurality of sound tracks containing recorded audio information, each sound track having a beginning at a given position near the periphery of the audio record, which sound track beginnings are placed about the periphery of the audio record at predetermined intervals, and a visual record including a plurality of spaced visual display areas containing projectable visual information, each of which visual display areas contains information correlated with a said sound track, and which visual display areas are positioned in a predetermined sequence corresponding to the predetermined sequence of sound tracks; and an audio-visual presentation apparatus comprising a chassis, receiving means comprising a table supported by the chassis for receiving the audio record in a fixed position on the table, and a platform supported by the chassis for receiving the visual record in a fixed position on the platform;

audio reproducing means supported by the chassis and positioned for engaging a said sound track of said received audio record for reproducing and thereby presenting the audio information therefrom;

projection means supported by the chassis and positioned for projecting and thereby presenting an image of visual information from a said visual display area of said received visual record onto a viewing screen;

a first positioning means supported by the chassis for relatively positioning the audio reproducing means and the table for enabling the audio reproducing means to engage the beginning of any of said sound tracks distributed about the periphery of said received audio record; and a second positioning means for relatively positioning the projection means and the platform for enabling projection onto said viewing screen of an image of visual information from any of said visual display areas of said received visual record;

wherein the audio record is rotatable relative to the visual record;

wherein the receiving means further comprises a carriage movably supported by the chassis;

wherein the table comprises a turntable rotatably supported on the carriage;

wherein the platform is fixedly supported on the carriage;

wherein the first positioning means comprises a turntable stepping means supported by the carriage for rotating the turntable in incremental steps, which steps correspond to the intervals between the beginnings of the sound tracks of said audio record;

wherein the second positioning means comprises a carriage stepping means supported by the chassis for stepping the carriage in incremental steps, which steps correspond to the spacing of the visual display areas of said visual record; and wherein the audio-visual presentation apparatus still further comprises a turntable drive means supported by the carriage for engaging the turntable for rotatably driving the turntable at a uniform rate for enabling audio information to be reproduced from a said received audio record engaged by the audio reproducing means.

15. An audio-visual system according to claim 14, wherein the audio-visual presentation apparatus further comprises a turntable braking means supported by the carriage and responsive to the completion of said reproduction of audio information from a said sound track by the audio reproducing means for engaging the turntable to thereby brake a said uniformly rotating turntable to a stop at the position from whence said turntable commenced to rotate.

16. An audio-visual system according to claim 14, wherein the audio-visual presentation apparatus further comprises a starting position marker rotatably positioned on the turntable;

a detecting means located on the carriage in a fixed home position in relation to the audio reproducing means and enabled in response to the completion of said reproduction of audio information from a said sound track by the audio reproducing means for detecting when the starting position marker on the turntable is at the home position; and a turntable braking means supported by the carriage for engaging the turntable to thereby brake the turntable to a stop, which turntable braking means engages the turntable to brake the turntable to a stop when the detecting means detects that the starting position marker is at the home position.

17. An audio-visual system according to claim 16, wherein the audio-visual presentation apparatus further comprises a starting position marker holder movably supported on the carriage for movement into position to hold the starting position marker at the home position while the turntable is being stepped by the turntable stepping means.

18. An audio-visual system for presenting correlated audio and visual information, comprising a thin audio-visual record medium comprising an audio record including in a predetermined sequence a plurality of sound tracks containing recorded audio information, each sound track having a beginning at a given position near the periphery of the audio record, which sound track beginnings are placed about the periphery of the audio record at predetermined intervals, and a visual record including a plurality of spaced visual display areas containing projectable visual information, each of which visual display areas contains information correlated with a said sound track, and which visual display areas are positioned in a predetermined sequence corresponding to the predetermined sequence of sound tracks; and an audio-visual presentation apparatus comprising a chassis;

receiving means supported by the chassis for receiving the audio-visual record medium, audio reproducing means supported by the chassis and positioned for engaging a said sound track of said received audio record for reproducing and thereby presenting the audio information therefrom;

projection means supported by the chassis and positioned for projecting and thereby presenting an image of visual information from a said visual display area of said received visual record onto a viewing screen; and positioning means supported by the chassis for relatively positioning the audio reproducing means and the audio record for enabling the audio reproducing means to engage the beginning of any of said sound tracks distributed about the periphery of said received audio record, and for relatively positioning the projection means and the visual record for enabling projection onto said viewing screen of an image of visual information from any of said visual display areas of said received visual record;

wherein each of said visual display areas includes a discrete section containing one or more projectable predetermined response choices related to the visual information contained in said visual display area;

wherein the projection means is capable of projecting said one or more predetermined response choices from said received visual record onto the viewing screen; and wherein the audio-visual presentation apparatus further comprises a shutter supported by the chassis between the viewing screen and the projection means in either a blocking position for blocking the projection of an image of said response choices onto the screen or in an enabling position for enabling the projection of an image of said response choices onto the screen, which shutter is moved into the enabling position upon the completion of said reproduction of audio information from a said sound track by the audio reproducing means.

19. An audio-visual system for presenting correlated audio and visual information, comprising a thin audio-visual record medium comprising an audio record including in a predetermined sequence a plurality of sound tracks containing recorded audio information, each sound track having a beginning at a given position near the periphery of the audio record, which sound track beginnings are placed about the periphery of the audio record at predetermined intervals, and a visual record including a plurality of spaced visual display areas containing projectable visual information, each of which visual display areas contains information correlated with a said sound track, and which visual display areas are positioned in a predetermined sequence corresponding to the predetermined sequence of sound tracks; and an audio-visual presentation apparatus comprising a chassis;

receiving means supported by the chassis for receiving the audio-visual record medium,

UNITED STATES PATENT OFFICE
CERTIFICATE OF CORRECTION

Patent No. 3,720,005          Dated March 13, 1973

Inventor(s) JOHN L. ROCHE

It is certified that error appears in the above-identified patent and that said Letters Patent are hereby corrected as shown below:

Column 14, line 42, change "138a" to -- 138b --.

Signed and sealed this 20th day of November 1973.

(SEAL)
Attest:

EDWARD M. FLETCHER, JR.
Attesting Officer

RENE D. TEGTMEYER
Acting Commissioner of Patents

UNITED STATES PATENT OFFICE
CERTIFICATE OF CORRECTION

Patent No. 3,720,005               Dated March 13, 1973

Inventor(s) JOHN L. ROCHE

It is certified that error appears in the above-identified patent and that said Letters Patent are hereby corrected as shown below:

Column 14, line 42, change "138a" to -- 138b --.

Signed and sealed this 20th day of November 1973.

(SEAL)
Attest:

EDWARD M. FLETCHER, JR.               RENE D. TEGTMEYER
Attesting Officer                     Acting Commissioner of Patents